United States Patent
Nishio

[11] Patent Number: 6,141,159
[45] Date of Patent: *Oct. 31, 2000

[54] VIEWFINDER OPTICAL SYSTEM

[75] Inventor: Akihiro Nishio, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/110,681

[22] Filed: Jul. 7, 1998

[30] Foreign Application Priority Data

Jul. 11, 1997 [JP] Japan ............... 9-202369
Jul. 31, 1997 [JP] Japan ............... 9-220893

[51] Int. Cl.⁷ ............... G02B 9/04; G02B 5/18
[52] U.S. Cl. ............... 359/793; 359/570; 359/717; 359/434
[58] Field of Search ............... 359/641, 642, 359/676, 692, 693, 717, 737, 793, 794, 795, 834, 835, 558, 570, 399, 422, 423, 431, 432; 396/84, 88, 296, 377, 379, 386, 384

[56] References Cited

U.S. PATENT DOCUMENTS

| | | | |
|---|---|---|---|
| 5,044,706 | 9/1991 | Chen | 359/357 |
| 5,268,790 | 12/1993 | Chen | 359/558 |
| 5,493,441 | 2/1996 | Chipper | 359/354 |
| 5,523,888 | 6/1996 | Nishio | 359/686 |
| 5,574,599 | 11/1996 | Hoshi et al. | 359/689 |

FOREIGN PATENT DOCUMENTS 6-324262  11/1994  Japan.
9-127322   5/1997  Japan.

*Primary Examiner*—Scott J. Sugarman
*Assistant Examiner*—David N. Spector
*Attorney, Agent, or Firm*—Fitzpatrick, Cella, Harper & Scinto

[57] ABSTRACT

A viewfinder optical system includes an objective optical system for forming an image of an object, and an eye-piece optical system for converting rays of light from the image into substantially parallel rays of light, wherein the objective optical system is provided with an optical element having a diffraction optical surface.

13 Claims, 29 Drawing Sheets

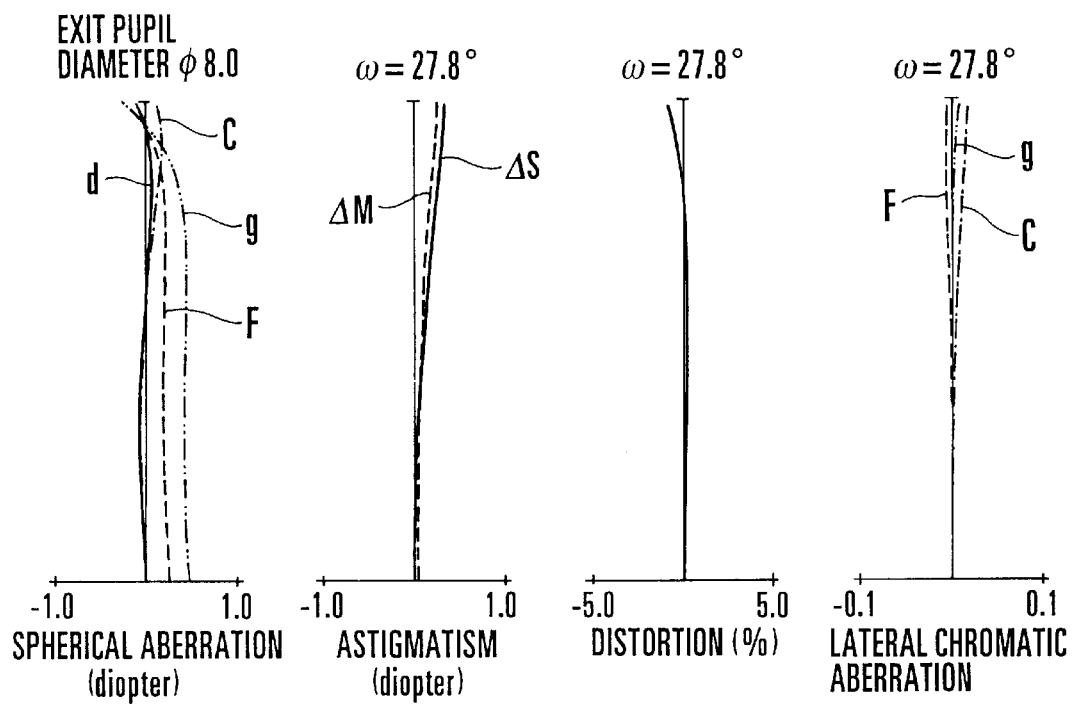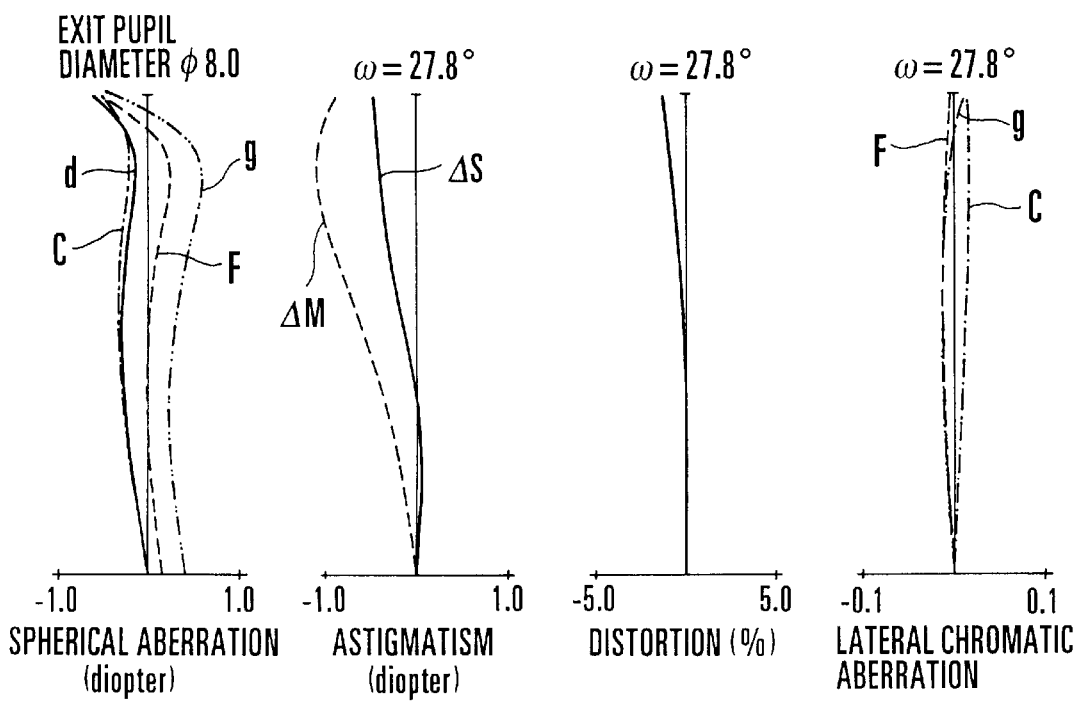

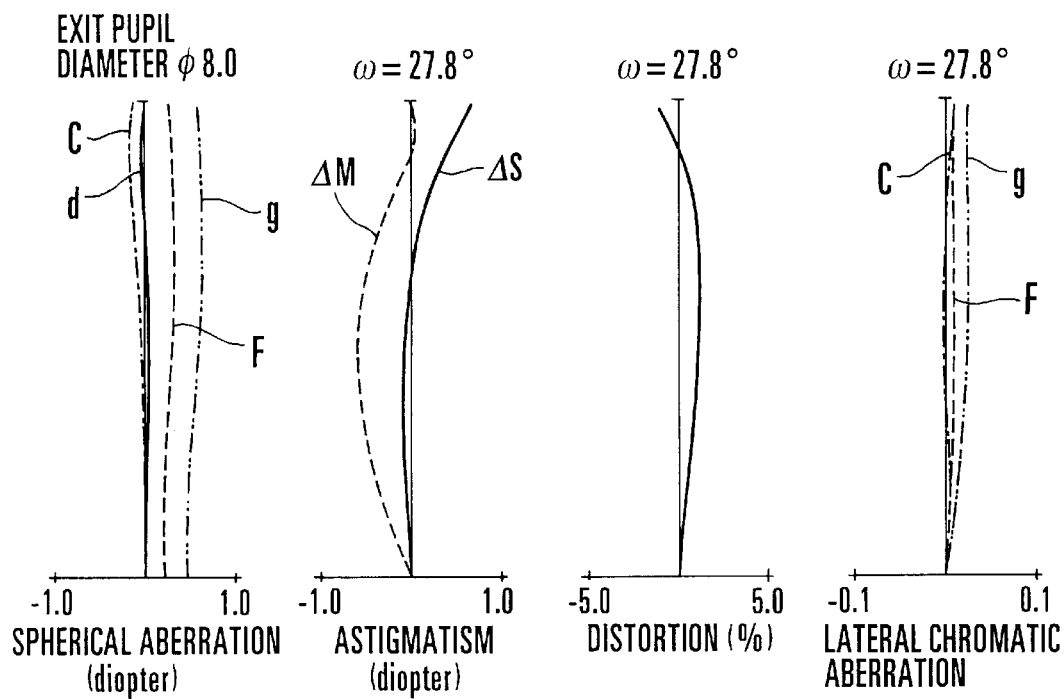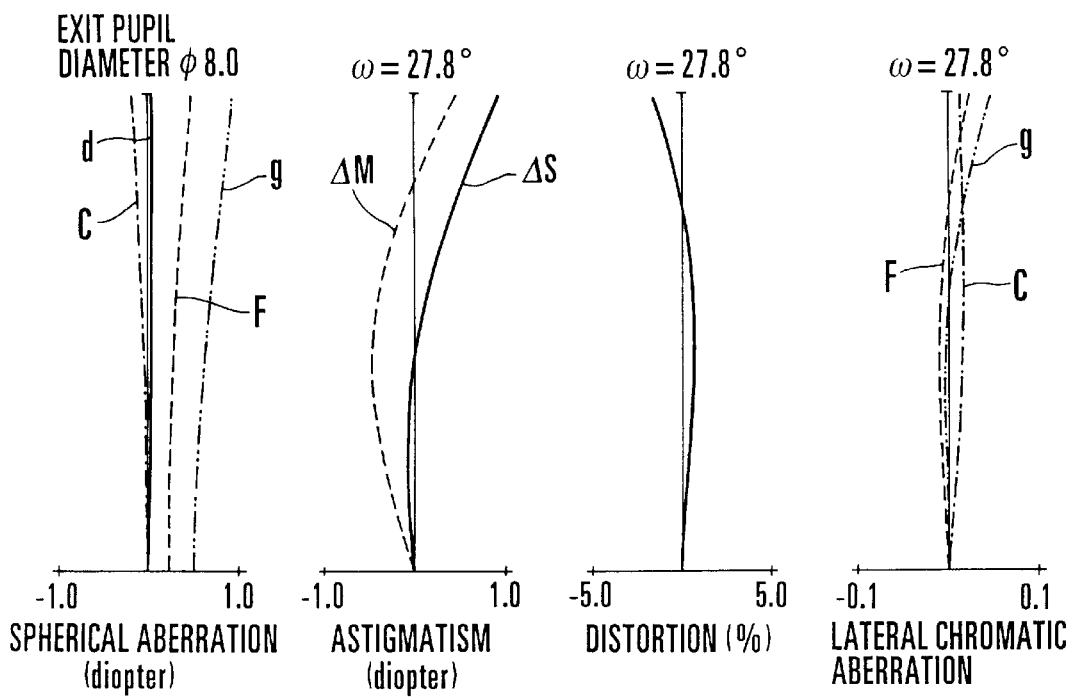

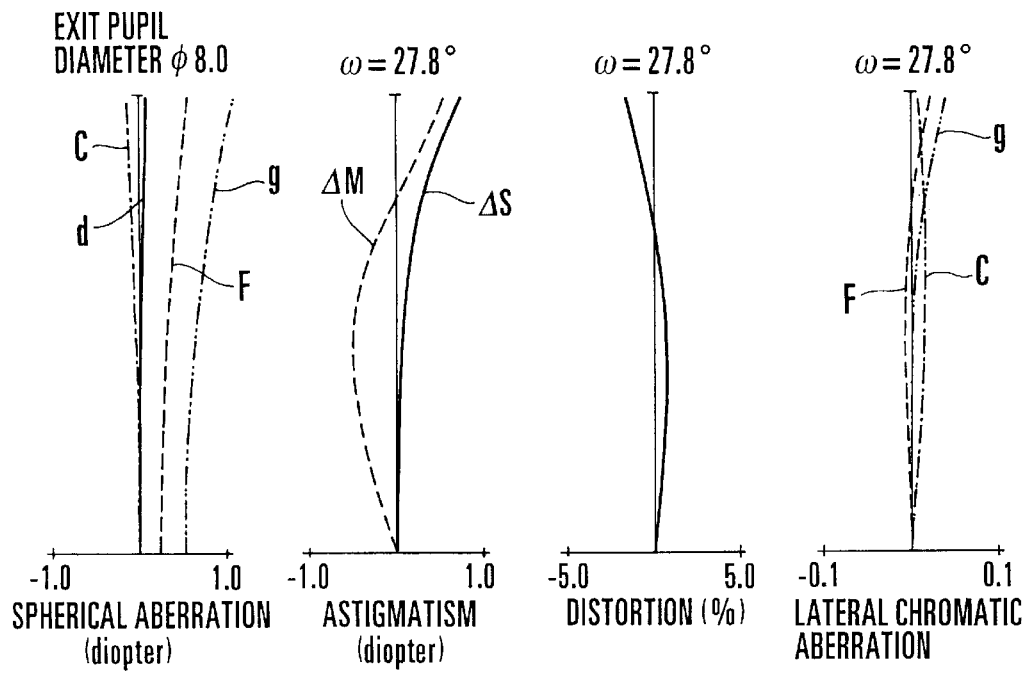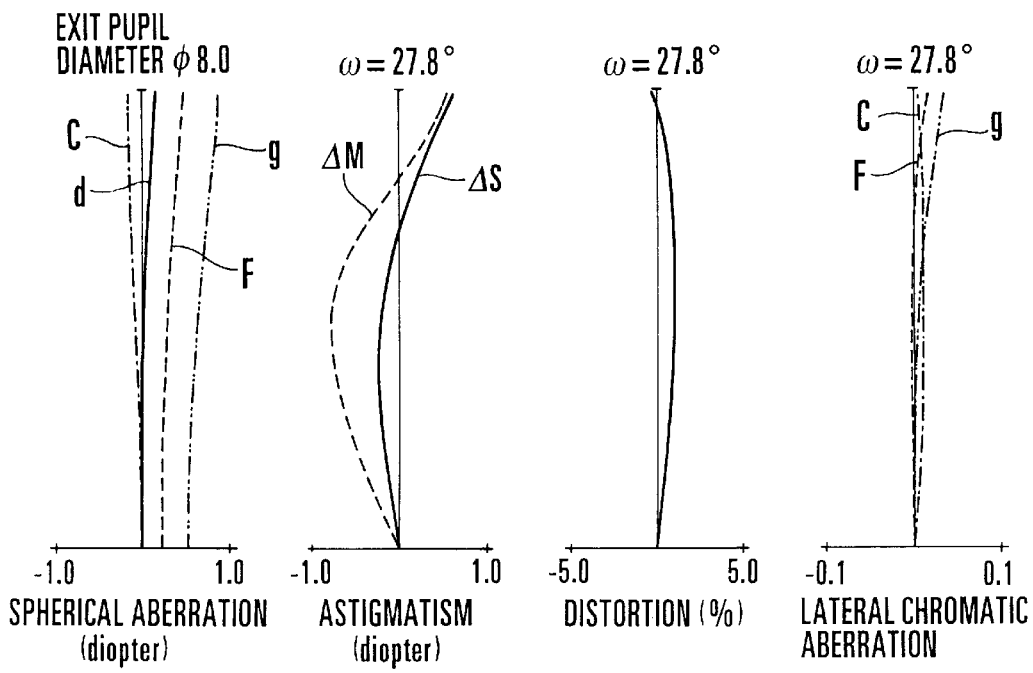

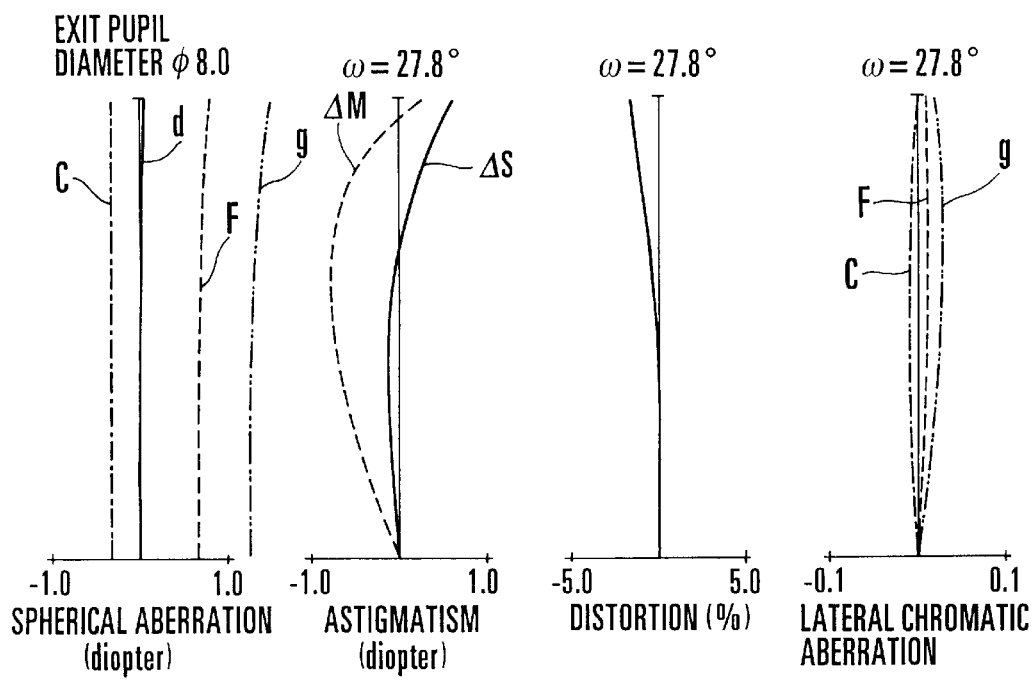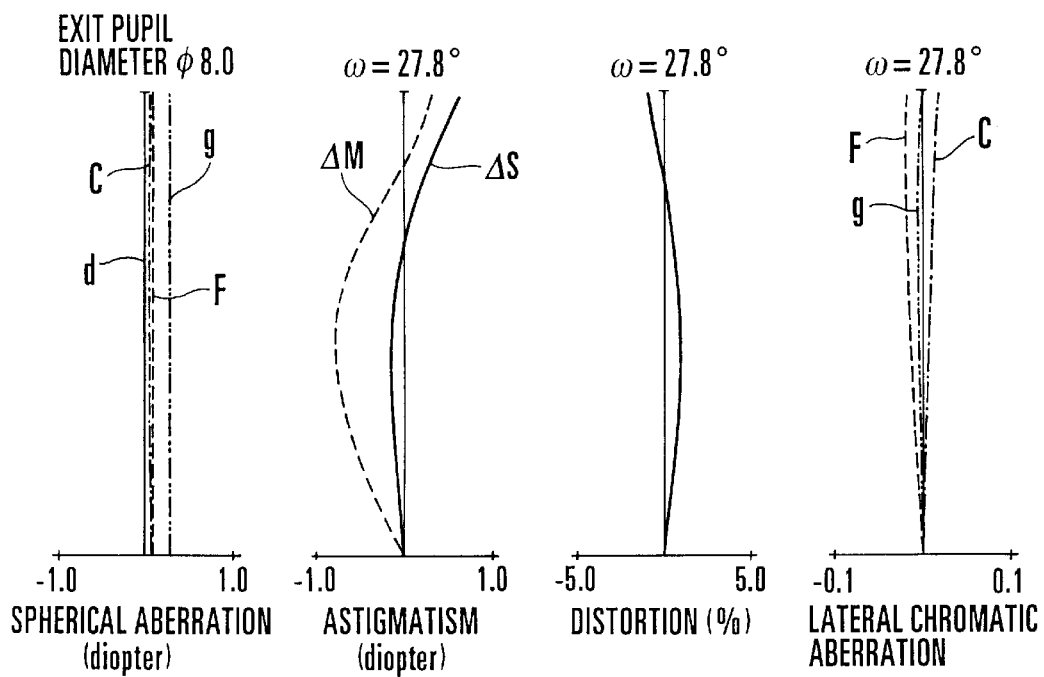

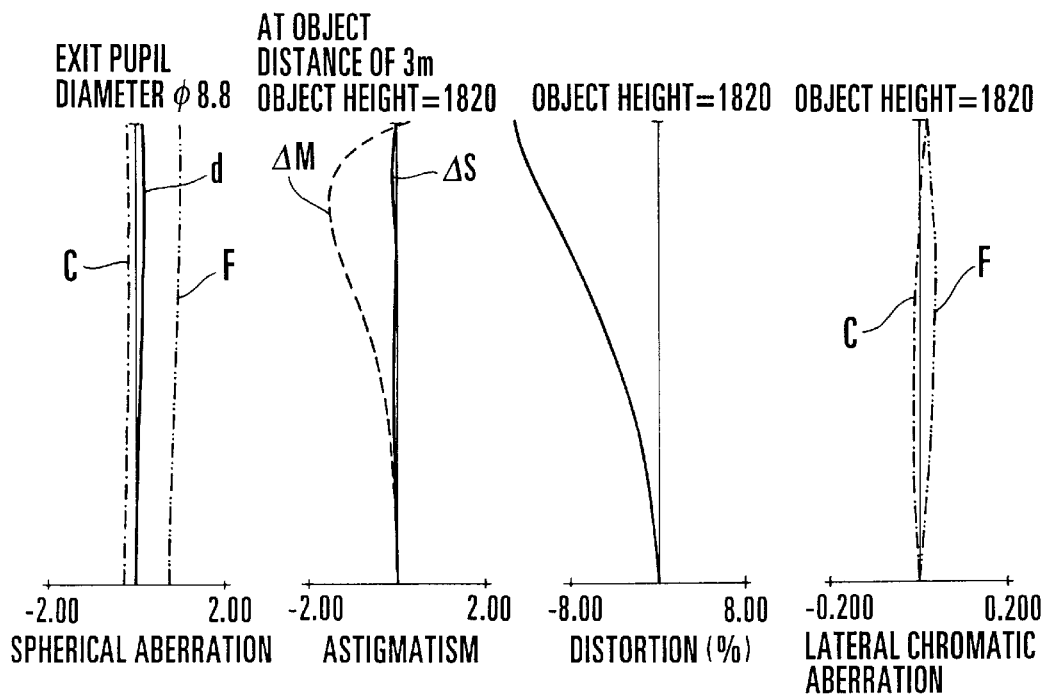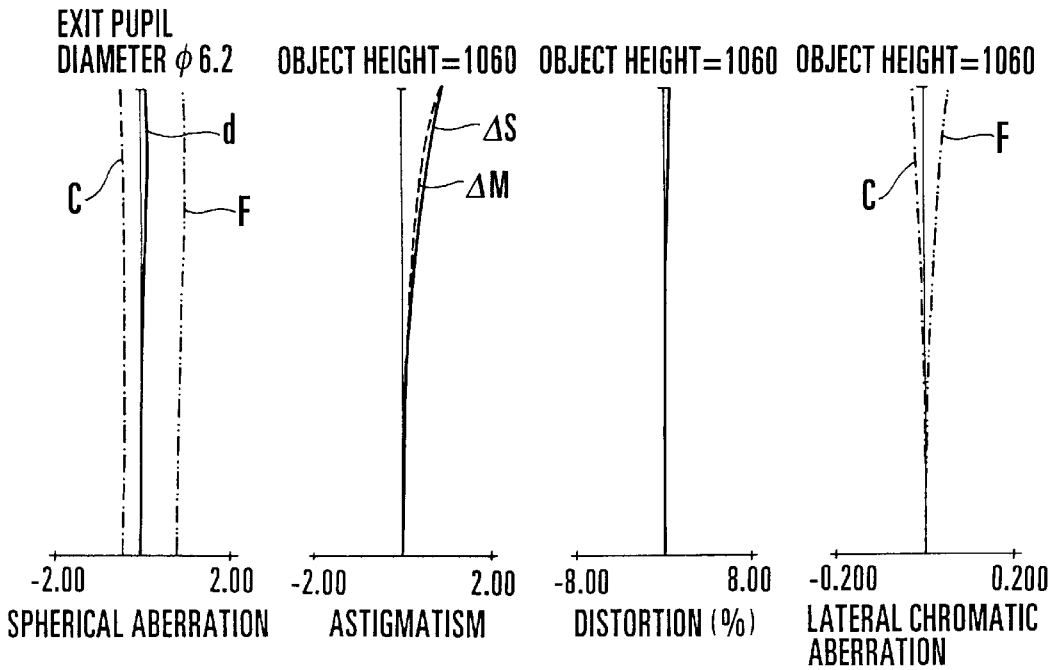

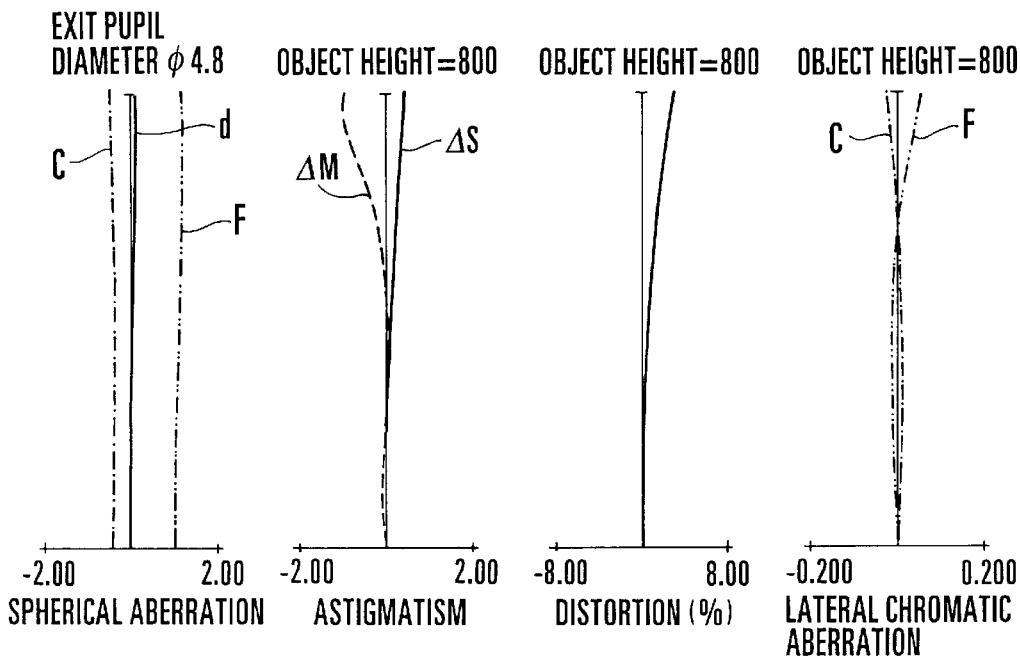
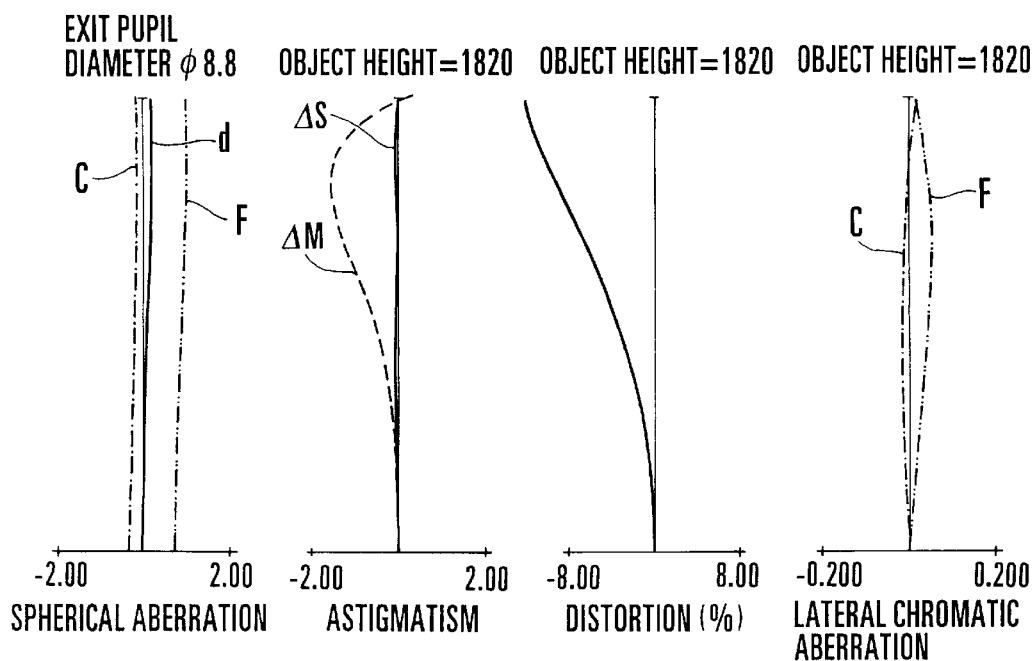

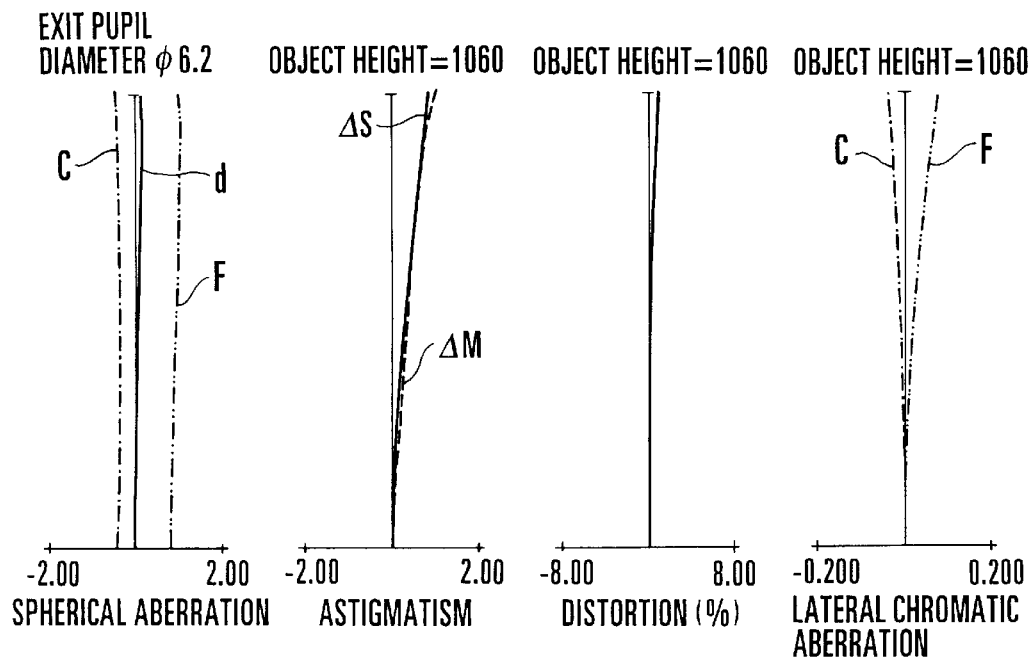
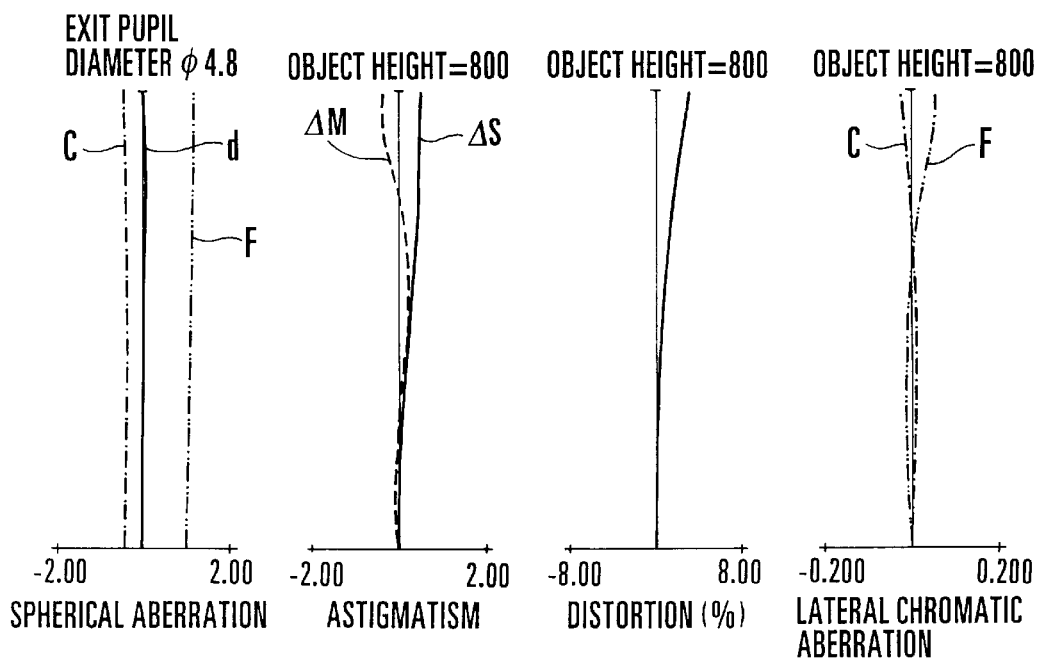

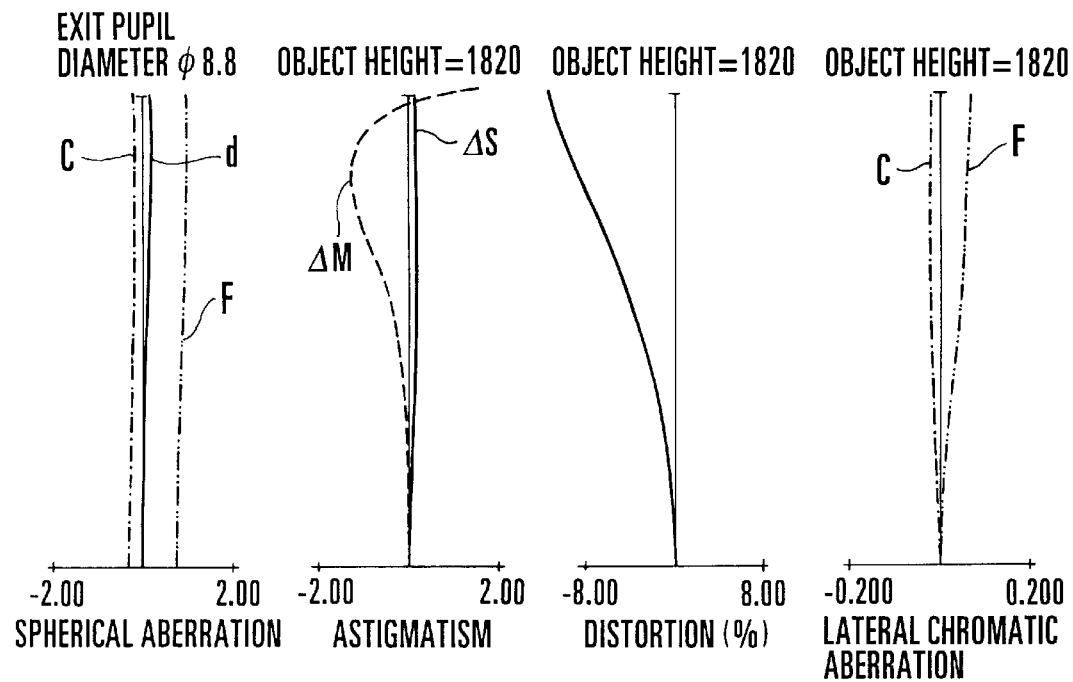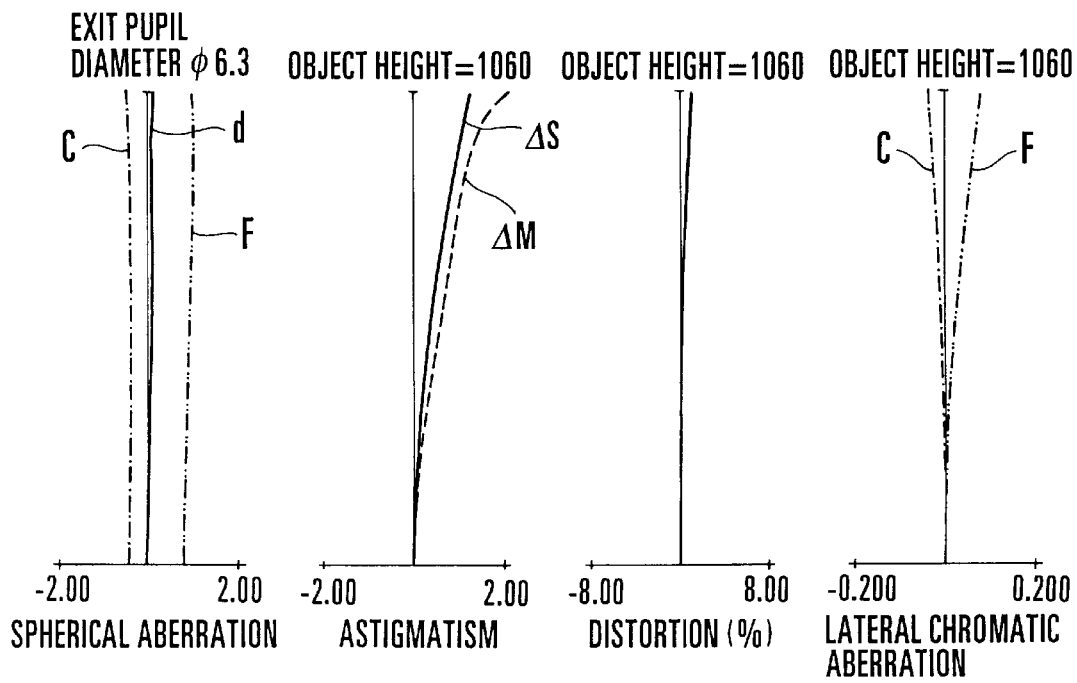

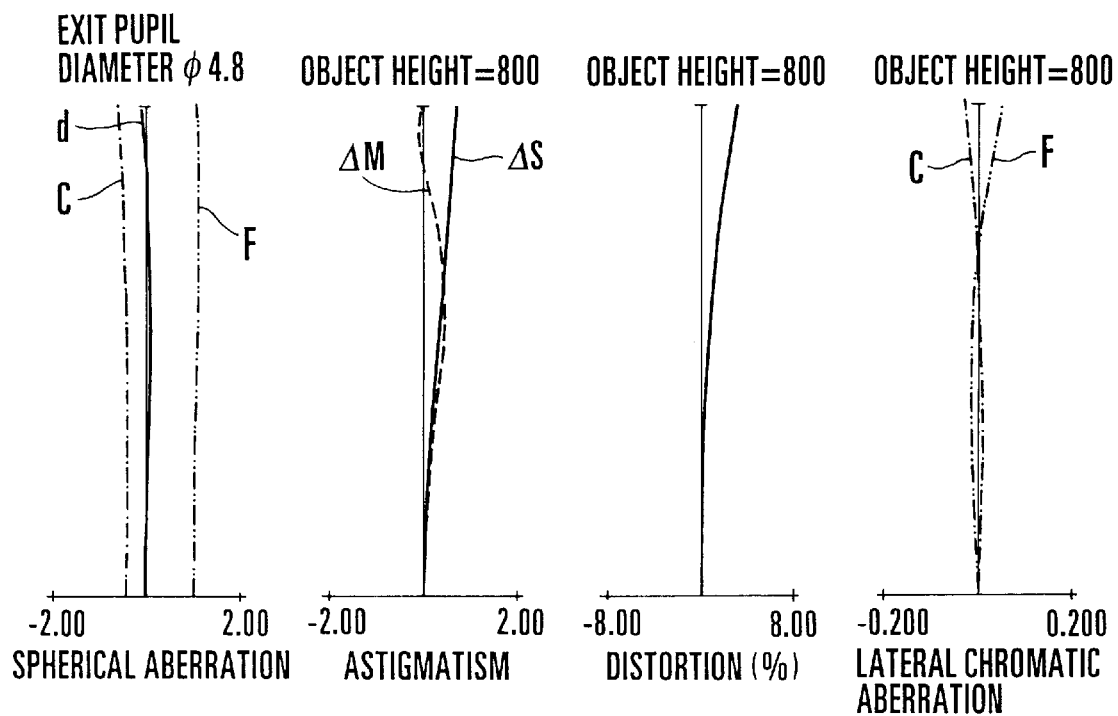
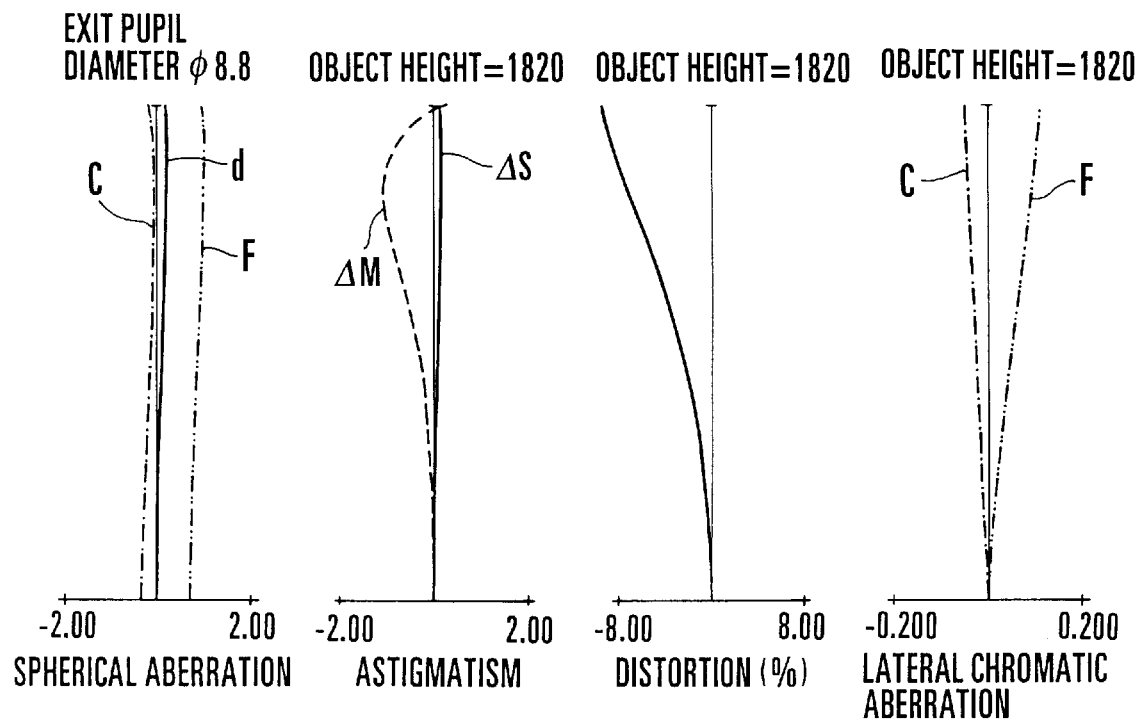

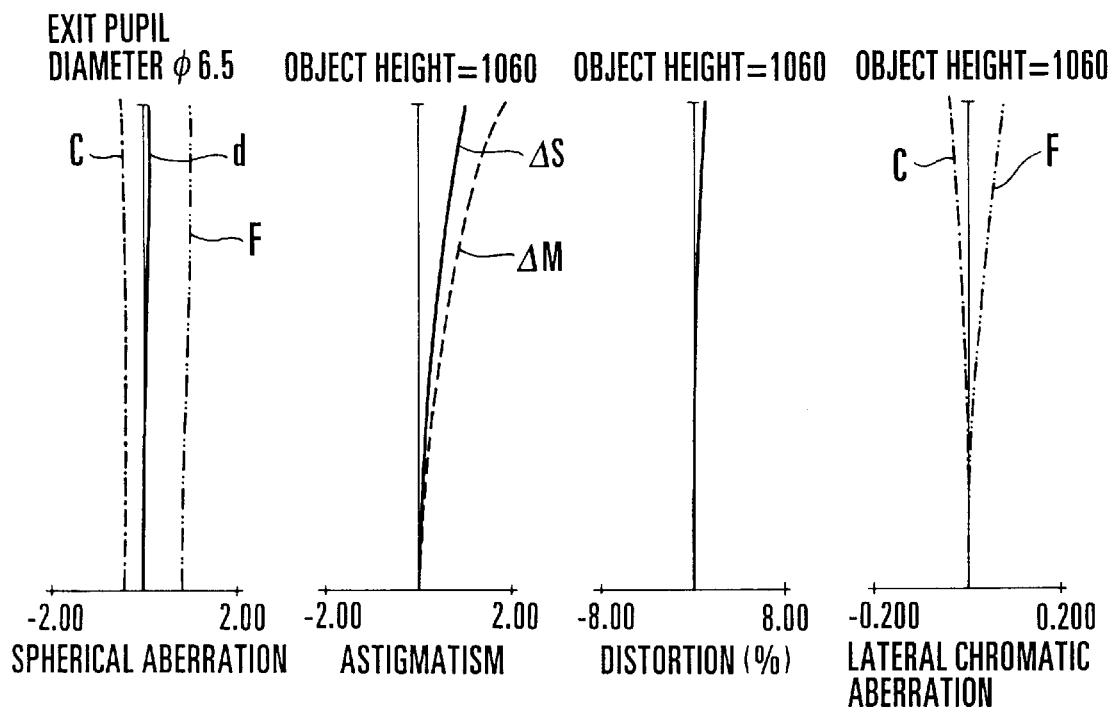
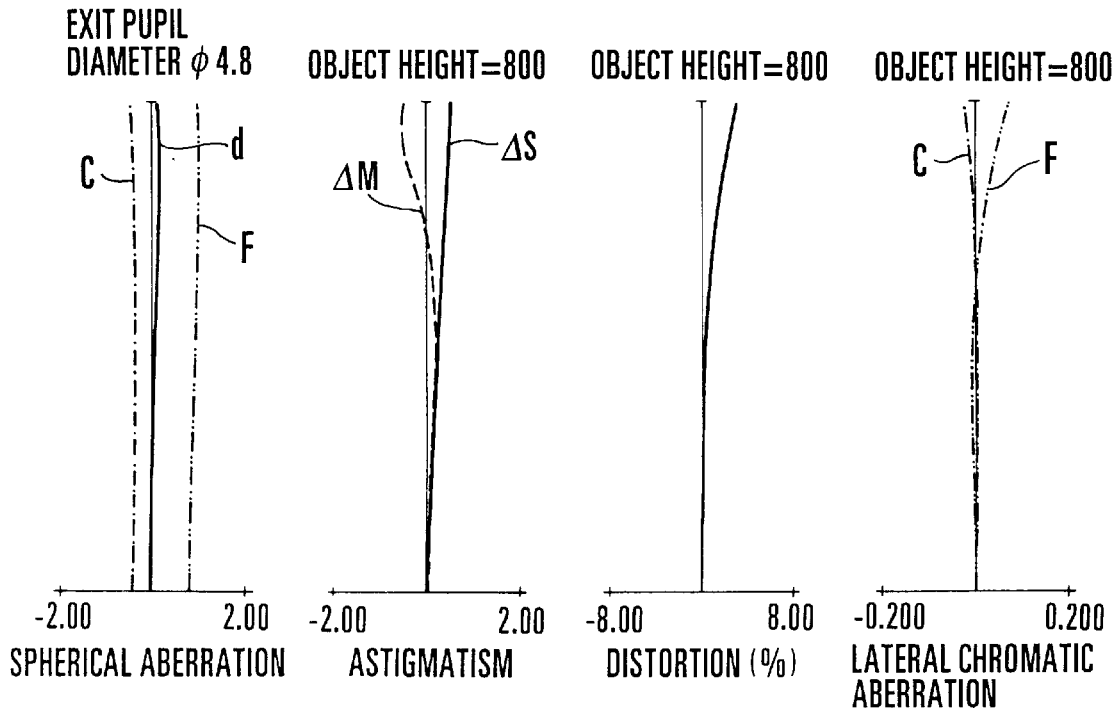

VIEWFINDER OPTICAL SYSTEM

BACKGROUND OF THE INVENTION

1. Field of the Invention

The present invention relates to viewfinders for use in lens-shutter (leaf-shutter) cameras, single-lens reflex cameras or the like.

2. Description of Related Art

In recent years, there have been proposed a great number of lens-shutter cameras in which the size of a photographic optical system thereof has been reduced to a compact form. Further, according to the reduction of the size of the photographic optical system, there is a growing demand for an external viewfinder mounted on the camera, being small in size and having an excellent optical performance.

Generally, to achieve such a compact viewfinder, it is required that the number of constituent lenses thereof is reduced and, at the same time, the refractive power of each lens unit is strengthened. However, this approach causes production of various aberrations. As a result, an optical system of high performance becomes difficult to attain.

Further, the recent trend is that ever-increasing numbers of the optical parts of the external viewfinder for lens-shutter cameras are manufactured by using plastic materials, in consideration of lowering the cost and of improving the productivity. In such a situation, it becomes important, despite no freedom of choosing glass materials, to attain improvements of the performance and of the compact form of the optical system without sacrificing the cost and productivity.

In consideration of the optical performance of the viewfinder, what determines whether the perception is good or bad when looking through the viewfinder depends largely on whether or not there are left small residual chromatic aberrations. If the amount of residual chromatic aberrations is large, color confusion appears at the contours of an object being observed, and flare components are produced, giving no good comfortableness to the observer.

Particularly, for a wide-angle viewfinder to be realized, the lateral chromatic aberration increases with an increase of the field angle. In the situation that, as described above, emphasis is laid on the cost and productivity, because the availability of optical materials is limited and the number of constituent lenses is restricted to a smaller value, a correction for the lateral chromatic aberration is difficult to carry out.

In general, on the premise that ordinary refracting optical elements are made use of, improvements of the optical performance of the real-image viewfinders are carried out by pairing up lens components of positive and negative refractive powers. In order to further improve the correction of all aberrations in good balance, it is unavoidable to increase the number of lens elements in the viewfinder.

Further, in order to reduce the number of lens elements while keeping good optical performance, another effective means is to introduce an aspheric surface. However, as far as the chromatic aberrations are concerned, because the correction for the chromatic aberrations depends on the difference in dispersion index between the materials of the paired lens elements of positive and negative powers, no valuable correcting effect is expected from the use of the aspheric surface.

On account of such a situation, there have been made previous proposals that, without relying on the dispersion characteristics of the optical materials, the amount of generation of chromatic aberrations can be controlled by making use of a diffraction optical element in the optical system, as disclosed in, for example, Japanese Laid-Open Patent Applications No. Hei 6-324262 and No. Hei 9-127322.

BRIEF SUMMARY OF THE INVENTION

An object of the invention is to provide a viewfinder optical system having a diffraction optical element of a novel structural arrangement.

To attain the above object, in accordance with an aspect of the invention, there is provided a viewfinder optical system, which comprises an objective optical system for forming an image of an object, and an eye-piece optical system for converting rays of light from the image into substantially parallel rays of light, wherein the objective optical system is provided with an optical element having a diffraction optical surface.

In accordance with another aspect of the invention, there is provided a viewfinder optical system, which comprises an objective optical system for forming an image of an object, and an eye-piece optical system for converting rays of light from the image into substantially parallel rays of light, wherein at least one of the objective optical system and the eye-piece optical system has a diffraction optical surface of rotational symmetry with respect to an optical axis, wherein, letting a distance from the optical axis be denoted by H, a reference wavelength be denoted by $\lambda$, and a phase coefficient with a term in the 2·i-th degree of H be denoted by $C2 \cdot i$, a phase $\phi(H)$ of the diffraction optical surface is expressed by the following expression:

$$\phi(H) = (2\pi/\lambda) \cdot (C2 \cdot H^2 + C4 \cdot H^4 + C6 \cdot H^6 + \ldots + C2 \cdot i \cdot H^{2 \cdot i})$$

and wherein, letting a phase coefficient with a term in the second degree of H for the j-th diffraction optical surface be denoted by $C2j$, and a paraxial refractive power and Abbe number of the k-th optical element included in the viewfinder optical system be denoted by $\psi k$ and $\nu k$, respectively, the following condition is satisfied:

$$0 > \sum_{k=1}^{m} (\psi k / \nu k) \cdot \sum_{j=1}^{n} (2 \cdot C2j / 3.45)$$

where n is the number of diffraction optical surfaces in the viewfinder optical system, and m is the number of optical elements in the viewfinder optical system.

In accordance with a further aspect of the invention, there is provided a viewfinder optical system, which comprises an objective optical system for forming an image of an object, and an eye-piece optical system for converting rays of light from the image into substantially parallel rays of light, wherein a diffraction optical element is disposed on an optical element which satisfies the following condition:

$$|HD| > |H|$$

where H is a distance from an optical axis of a maximum zone in a bundle of on-axial light rays passing through optical elements which constitute the viewfinder optical system, and HD is a distance from the optical axis of an off-axial principal ray which halves a bundle of off-axial light rays having an effective maximum field angle.

These and further objects and aspects of the invention will become apparent from the following detailed description of preferred embodiments thereof taken in conjunction with the accompanying drawings.

BRIEF DESCRIPTION OF THE SEVERAL VIEWS OF THE DRAWING

FIGS. 16A to 16D are graphic representations of the aberrations in the embodiment 1.

FIGS. 17A to 17D are graphic representations of the aberrations in the embodiment 2.

FIGS. 18A to 18D are graphic representations of the aberrations in the embodiment 3.

FIGS. 19A to 19D are graphic representations of the aberrations in the embodiment 4.

FIGS. 20A to 20D are graphic representations of the aberrations in the embodiment 5.

FIGS. 21A to 21D are graphic representations of the aberrations in the embodiment 6.

FIGS. 22A to 22D are graphic representations of the aberrations in the embodiment 7.

FIGS. 23A to 23D are graphic representations of the aberrations in the embodiment 8.

FIGS. 32A to 32D are graphic representations of the aberrations in the embodiment 9 in the wide-angle end.

FIGS. 33A to 33D are graphic representations of the aberrations in the embodiment 9 in a middle focal length position.

FIGS. 34A to 34D are graphic representations of the aberrations in the embodiment 9 in the telephoto end.

FIGS. 35A to 35D are graphic representations of the aberrations in the embodiment 10 in the wide-angle end.

FIGS. 36A to 36D are graphic representations of the aberrations in the embodiment 10 in a middle focal length position.

FIGS. 37A to 37D are graphic representations of the aberrations in the embodiment 10 in the telephoto end.

FIGS. 38A to 38D are graphic representations of the aberrations in the embodiment 11 in the wide-angle end.

FIGS. 39A to 39D are graphic representations of the aberrations in the embodiment 11 in a middle focal length position.

FIGS. 40A to 40D are graphic representations of the aberrations in the embodiment 11 in the telephoto end.

FIGS. 41A to 41D are graphic representations of the aberrations in a conventional example in the wide-angle end.

FIGS. 42A to 42D are graphic representations of the aberrations in the conventional example in a middle focal length position.

FIGS. 43A to 43D are graphic representations of the aberrations in the conventional example in the telephoto end.

DETAILED DESCRIPTION OF THE INVENTION

Hereinafter, preferred embodiments of the invention will be described in detail with reference to the drawings.

Figure 1:
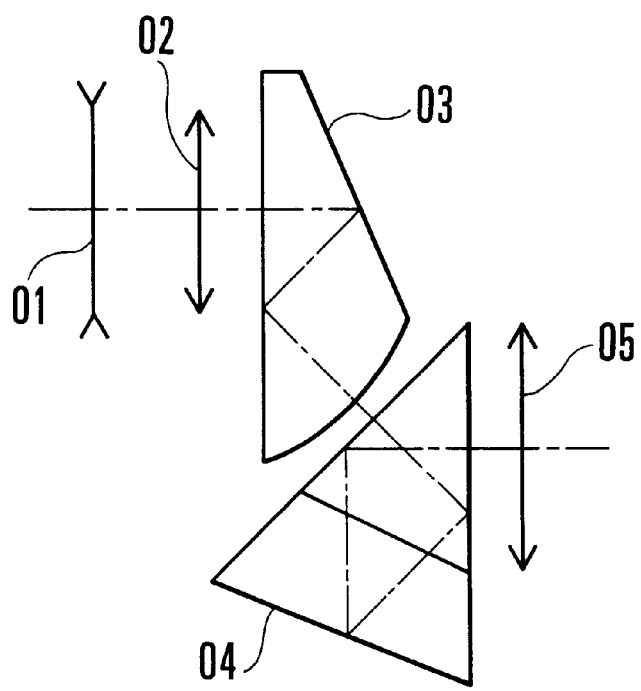
FIG. 1 is a schematic diagram showing the construction of a viewfinder optical system according to each of embodiments 1 to 8 of the invention.

FIG. 1 in schematic diagram shows the optical system of a real-image viewfinder according to an embodiment 1 of the invention. In the optical system, there are arranged an objective lens O1, an image re-forming lens O2, an inverting prism O3, a Pechan roof prism O4 and an eye-piece lens O5 in this order from the object side. In the embodiment 1, the objective lens O1, the image re-forming lens O2 and the inverting prism O3 constitute an objective optical system, the Pechan roof prism O4 constitutes an image inverting optical system, and the eye-piece lens O5 constitutes an eye-piece optical system.

Figure 2:
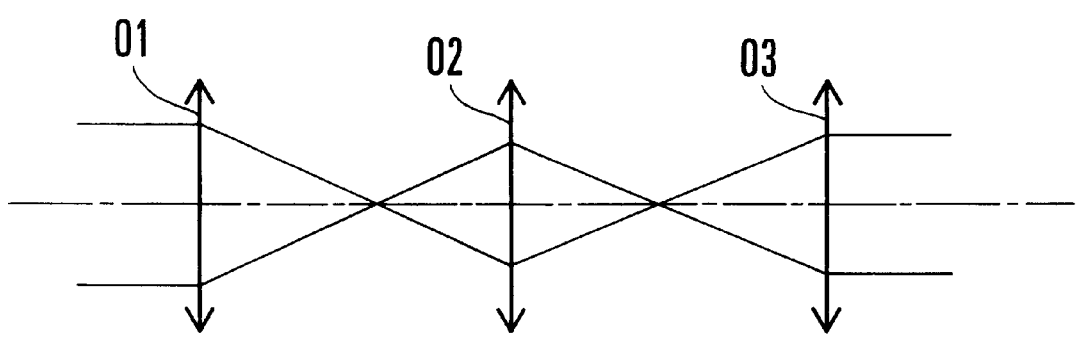
FIG. 2 is a schematic diagram of a secondary image forming type of real-image viewfinder.

Incidentally, in the real-image viewfinder, the image inverting optical system may be in the form of a Porro-prism or like prism, or mirrors. Otherwise, without using such prisms or mirrors, the real-image viewfinder may be formed to a secondary image forming type of real-image viewfinder, as shown schematically in FIG. 2.

Figure 3:
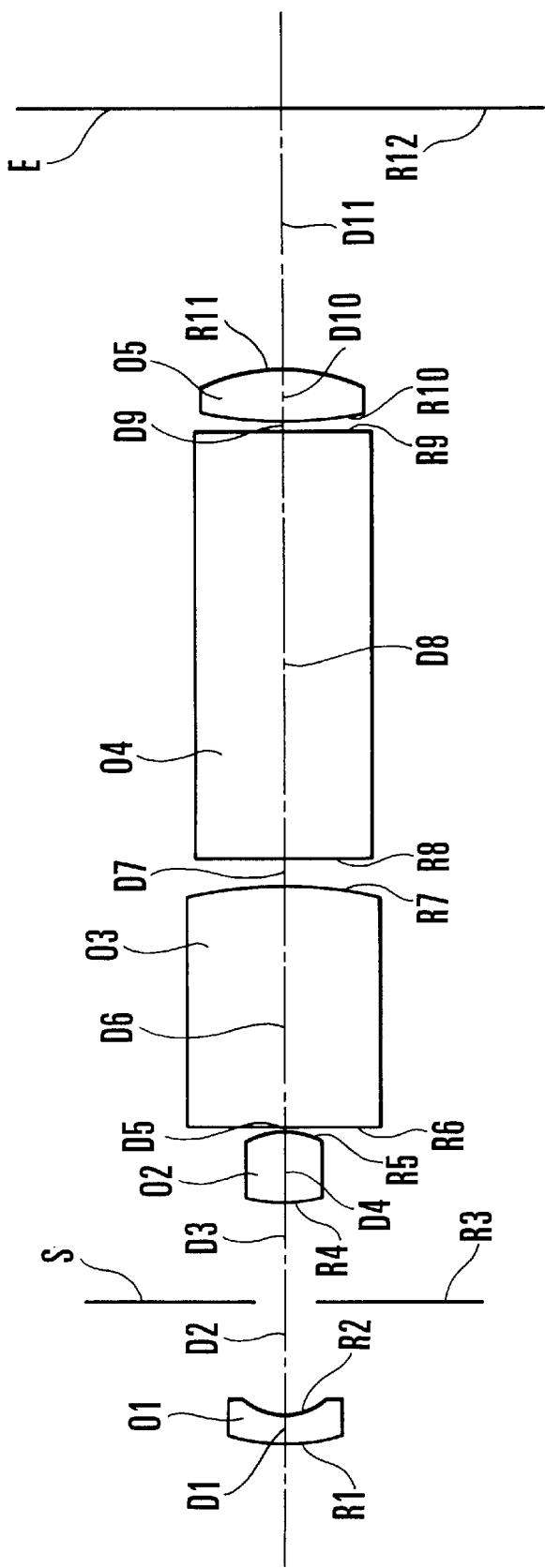
FIG. 3 is a longitudinal section view of the construction of the embodiment 1.

FIG. 3 in lens block diagram shows the main constituent parts of the embodiment 1 of the real-image viewfinder with the image inverting optical system of FIG. 1 in optically developed form. In FIG. 3, S stands for a fixed stop, and E stands for the eye point. A surface R4 on the object side of the image re-forming lens O2 is a diffraction optical surface.

Figure 4:
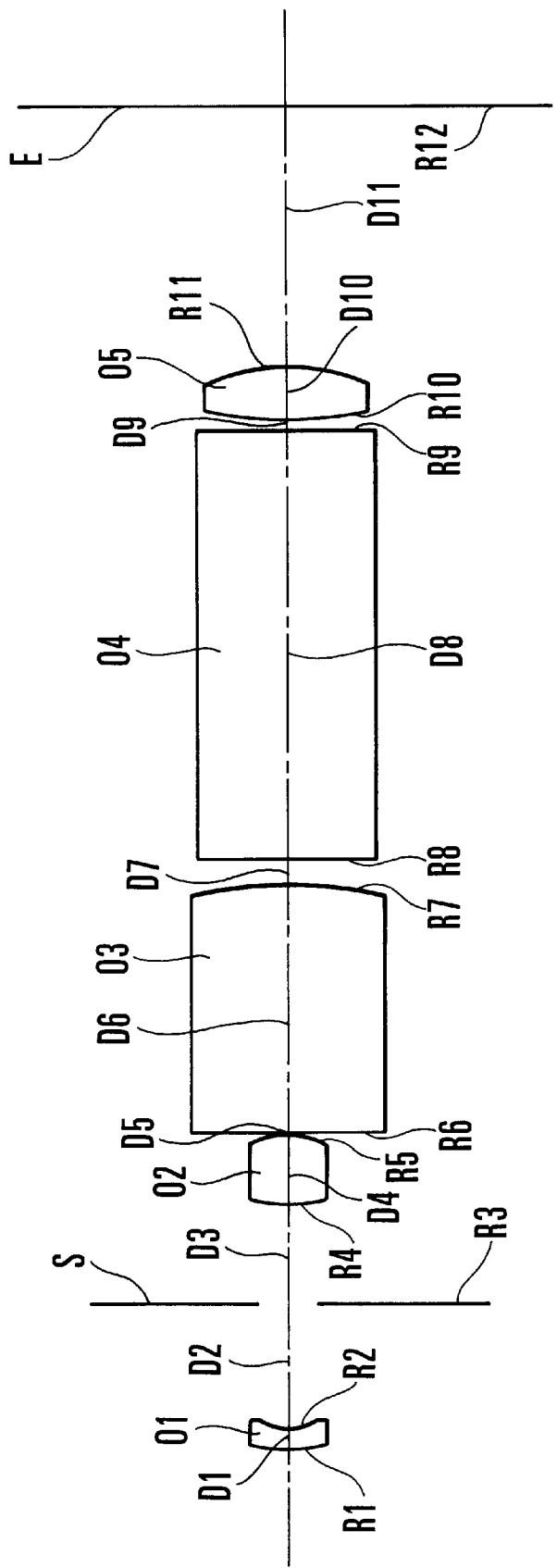
FIG. 4 is a longitudinal section view of the construction of the embodiment 2.
Figure 5:
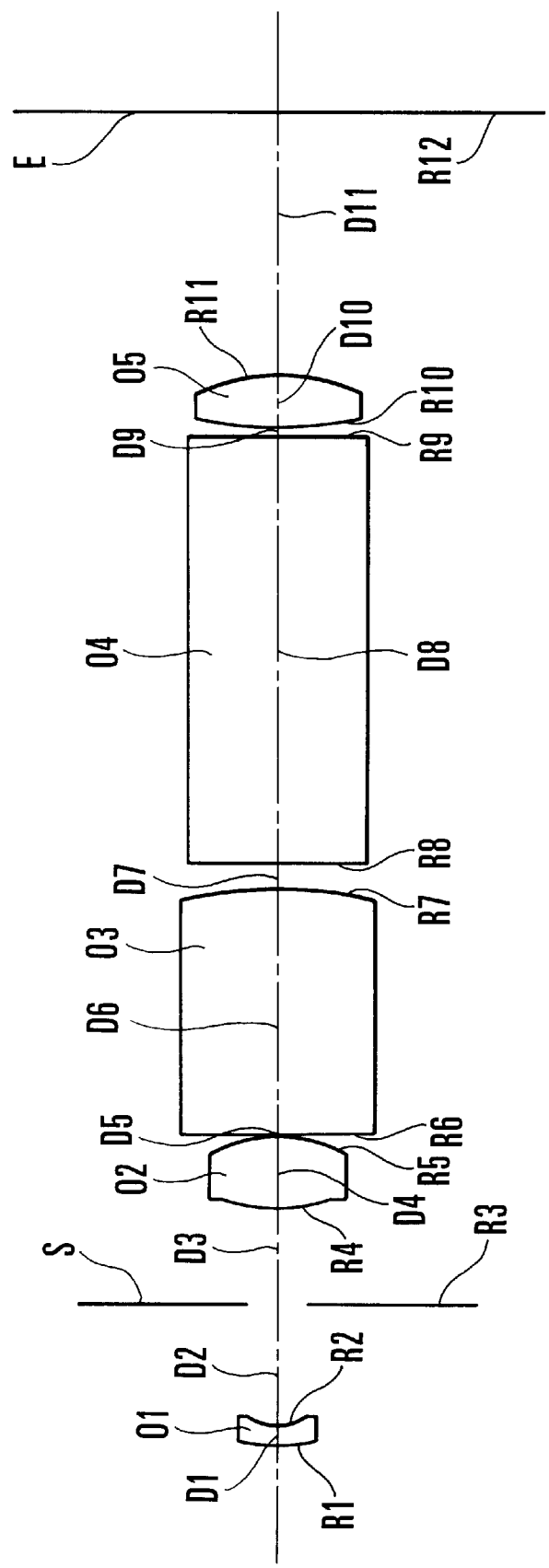
FIG. 5 is a longitudinal section view of the construction of the embodiment 3.

FIG. 4 in lens block diagram shows the main constituent parts of the embodiment 2, in which a surface R5 on the image side of the image re-forming lens O2 is a diffraction optical surface. FIG. 5 in lens block diagram shows the main constituent parts of the embodiment 3, in which a surface R2 on the image side of the objective lens O1 and a surface R4 on the object side of the image re-forming lens O2 are diffraction optical surfaces.

Figure 6:
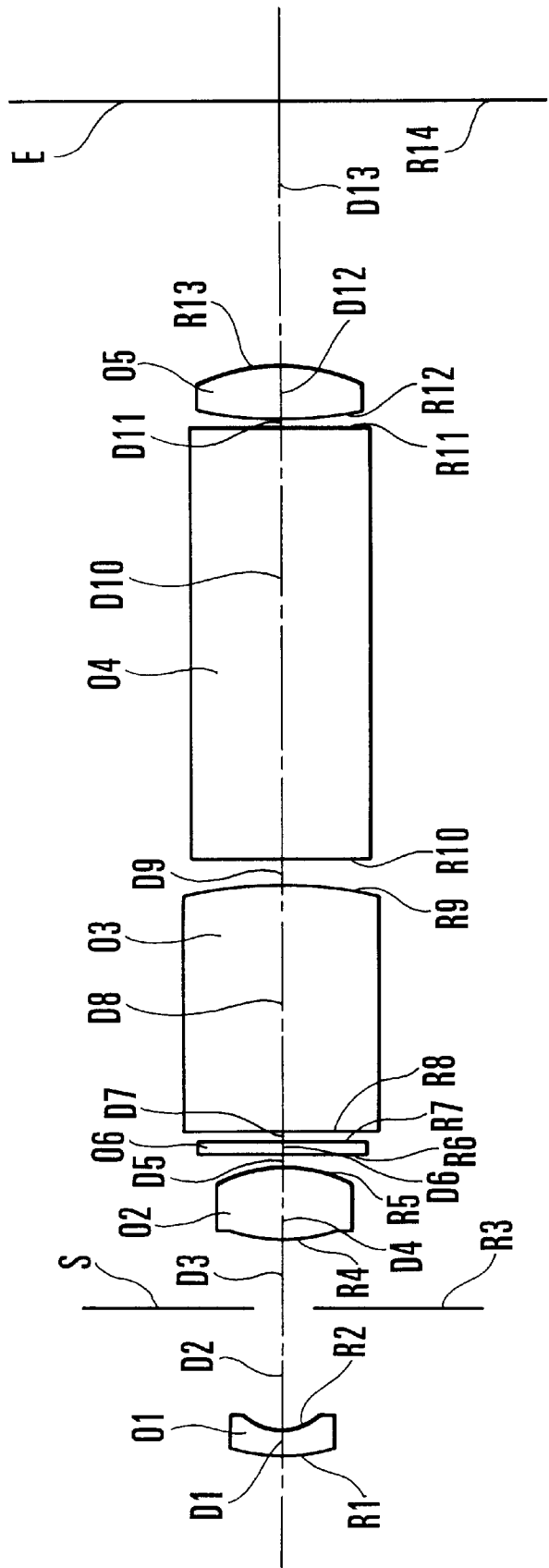
FIG. 6 is a longitudinal section view of the construction of the embodiment 4.

FIG. 6 in lens block diagram shows the main constituent parts of the embodiment 4, in which a diffraction optical plate O6 is disposed in between the image re-forming lens O2 and the inverting prism O3. A surface R7 on the image side of the diffraction optical plate O6 is a diffraction optical surface. In the case of the embodiment 4, the diffraction optical plate O6 is included in the objective optical system. This applies also to the embodiments 5 to 8, which will be described later.

Figure 7:
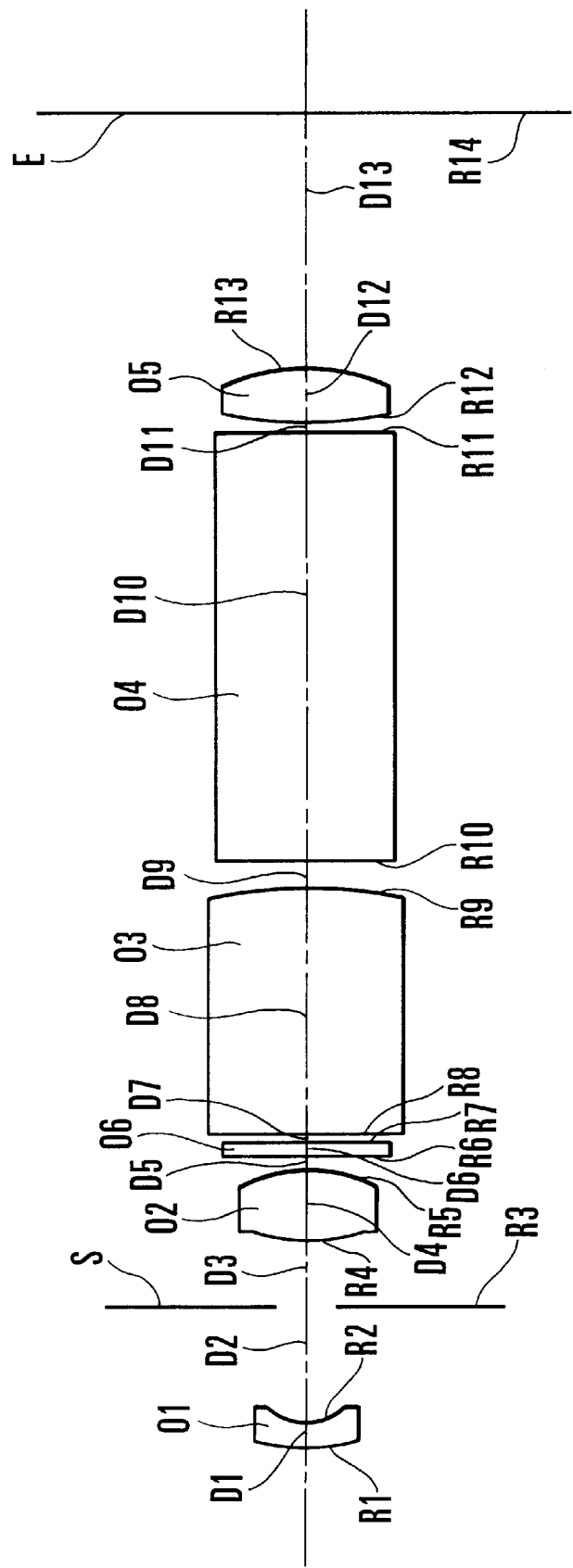
FIG. 7 is a longitudinal section view of the construction of the embodiment 5.
Figure 8:
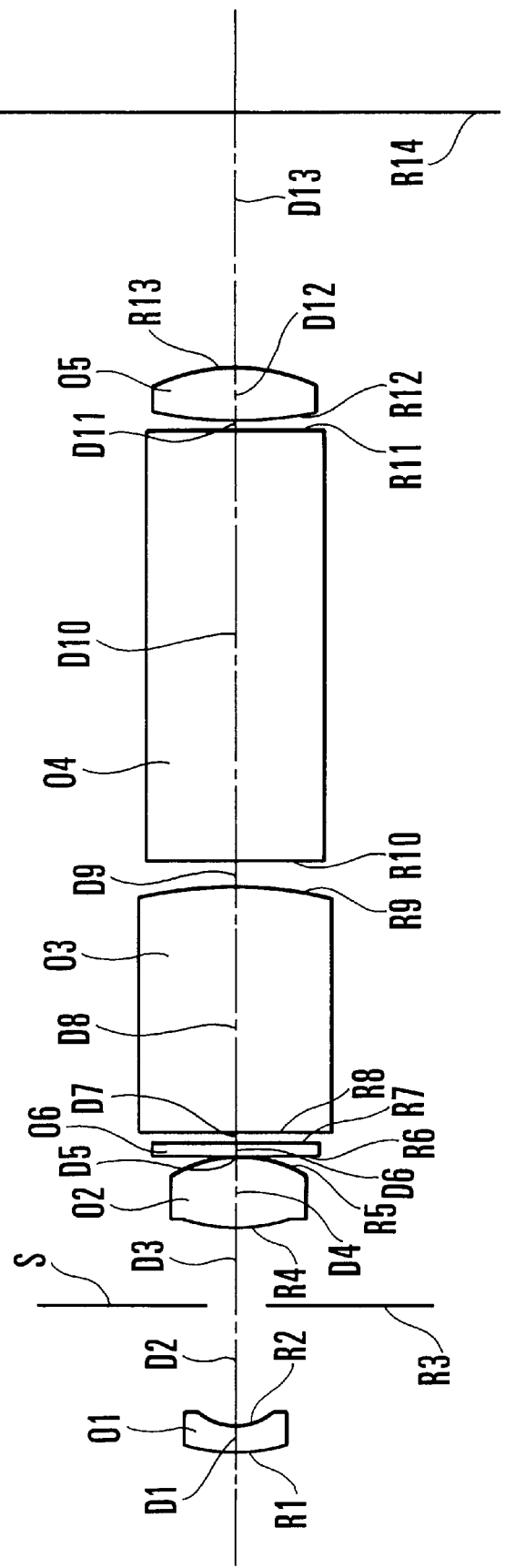
FIG. 8 is a longitudinal section view of the construction of the embodiment 6.

Likewise, FIG. 7 shows the main constituent parts of the embodiment 5, in which a surface R6 on the object side of the diffraction optical plate O6 is a diffraction optical surface. Also, FIG. 8 shows the main A constituent parts of the embodiment 6, in which both surfaces R6 and R7 of the diffraction optical plate O6 are diffraction optical surfaces.

Figure 9:
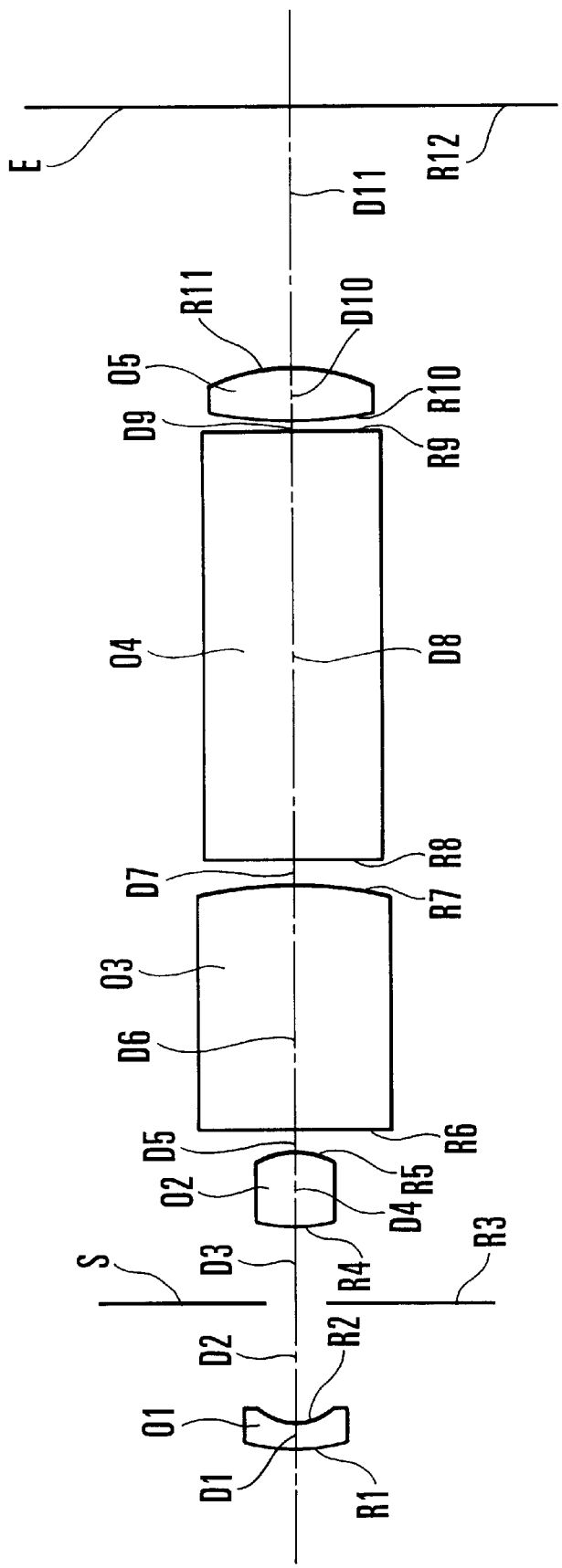
FIG. 9 is a longitudinal section view of the construction of the embodiment 7.

FIG. 9 in lens block diagram shows the main constituent parts of the embodiment 7, in which a surface R7 on the image side of the inverting prism O3 is a diffraction optical surface.

Figure 10:
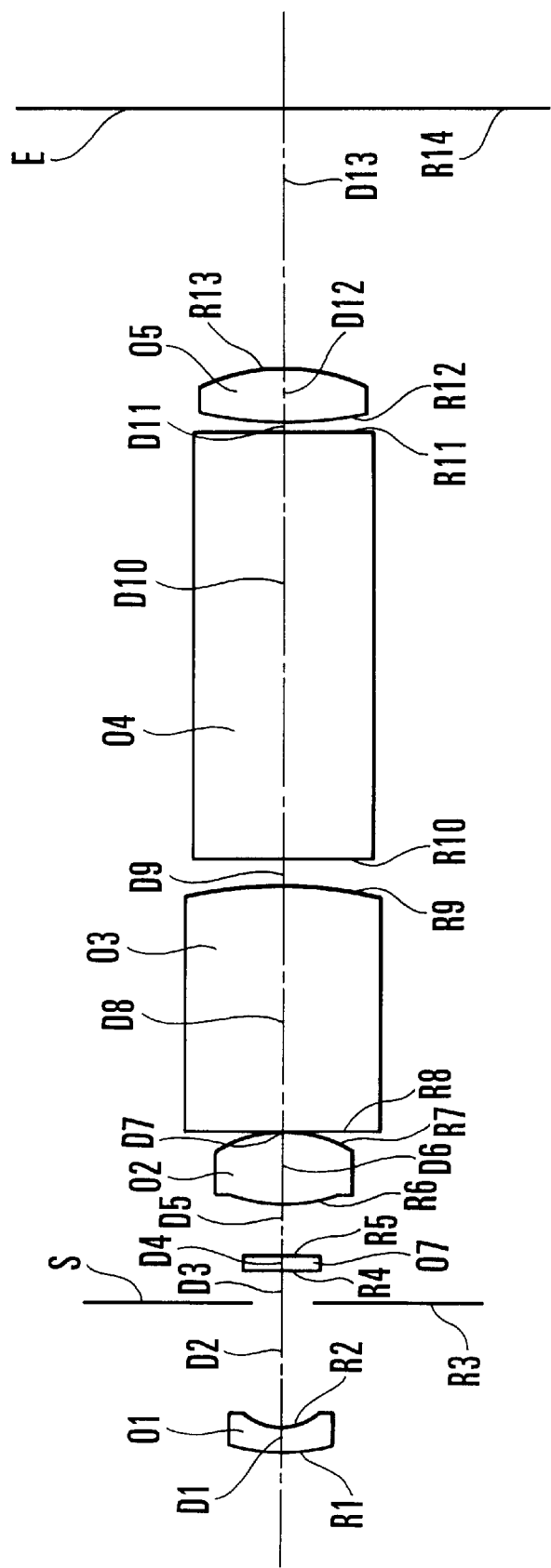
FIG. 10 is a longitudinal section view of the construction of the embodiment 8.

FIG. 10 in lens block diagram shows the main constituent parts of the embodiment 8, in which a diffraction optical plate O7 is disposed in between the objective lens O1 and the image re-forming lens O2. A surface R4 on the object side of the diffraction optical plate O7 is a diffraction optical surface.

Such diffraction optical elements having a diffraction optical surface are manufactured by making up the grooves in a stepwise form called "binary optics" directly on the surfaces of the optical elements by lithography. Besides this method, there is another one, that that method is used to take casts, thus producing replica gratings. Still another method is to take a mold from which gratings are reproduced. Also, if the grooves are made up in the saw-tooth form, that is, kinoform, the diffraction efficiency increases. So, a diffraction effect close to the ideal value can be expected.

Since the grooves of the diffraction optical surface are very fine in width and are spaced very close, the diffraction optical surface is very susceptible to scratches and dust or foreign particles. For this reason, it is preferred that a surface other than the frontmost or rearmost one of the viewfinder optical system be selected as a diffraction optical surface as far as possible.

In general, spherical lenses or like ordinary refracting optical elements are used in making up the real-image viewfinder. Within this framework, the optical performance is usually improved by combining two components of opposite refractive powers. To correct all aberrations in good balance, however, the total number of lens elements is caused to increase largely.

To reduce the number of lens elements while keeping the improved optical performance, it is advantageous to introduce an aspherical lens. Concerning the chromatic aberrations, however, even with the help of the aspherical lens, no improved results can be expected, because the chromatic correction depends on the difference in dispersion index between the materials of the paired-up components of negative and positive refractive powers.

A diffraction optical surface of rotational symmetry with respect to the optical axis can be expressed in terms of the distance H from the optical axis by an equation for the phase $\phi(H)$ at the distance H, as follows:

$$\phi(H)=(2\pi/\lambda)\cdot(C2\cdot H^2+C4\cdot H^4+C6\cdot H^6+\ldots+C2\cdot i\cdot H^{2\cdot i}) \quad (1)$$

where $\lambda$ is the reference wavelength (spectral d-line), and $C2\cdot i$ is the phase coefficient with the term in the 2-i-th degree of H.

It is then made possible to control the refractive power of the paraxial zone and the chromatic aberrations for the reference wavelength in accordance with variation of the phase coefficients C2 in the equation (1). The coefficient C4 and other coefficients of higher degree terms are usable for producing a similar effect to that of the aspheric surface in that the refractive power varies with the height of incidence of light on the diffraction optical surface. At the same time, it is possible to control the chromatic aberrations for the reference wavelength in accordance with variation of the height of incidence of light. Moreover, in either case, for a small variation of the refractive power, a large variation of the chromatic aberrations can be obtained.

The use of the diffraction optical element in the real-image viewfinder leads to providing of the possibility of using the aspheric surface in correcting various aberrations while still permitting the chromatic aberrations to be controlled, which could not be corrected only by introducing the aspheric surface.

By utilizing the above-described feature of the diffraction optical element, it is, therefore, possible to improve the optical performance of the viewfinder with the limitation of the number of lenses to a minimum. That is, among all the aberrations that determine whether or not the finder image is comfortably observed by the naked eye, the chromatic ones in particular are corrected well. A real-image viewfinder having an improved performance is thus achieved.

Another feature of the invention is that the viewfinder has an optical system of widened field angle with an increased image magnification. Since, in this case, the objective optical system produces large longitudinal and lateral chromatic aberrations, it is preferred that, as a means for correcting these aberrations, a location for the diffraction optical element is taken within the objective optical system.

A furthermore feature of the invention is that, letting the coefficient in the second degree of the j-th diffraction optical surface be denoted by C2j, and the paraxial refractive power and Abbe number of the k-th optical element included in the viewfinder optical system be denoted by $\psi k$ and $\upsilon k$, respectively, the following condition is satisfied:

$$0>\Sigma_{k=1}^{m}(\psi k/\upsilon k)\cdot\Sigma_{j=1}^{n}(2\cdot C2j/3.45) \quad (2)$$

k-1 J-1 where n is the number of diffraction optical surfaces in the viewfinder optical system, and m is the number of optical elements in the viewfinder optical system.

The first term $(\Sigma_{k=1}^{m}(\psi k/\upsilon k))$ in the factor of the condition (2) is a simple formula representing the achromatic state of the refracting optical system in the viewfinder.

In general, the Abbe number (dispersion index) $\upsilon d$ of the refracting optical system is expressed by $\upsilon d=(Nd-1)/(NF-NC)$, where Nd, NC and NF are the refractive indices for the d, C and F lines, respectively. On the other hand, the Abbe number $\upsilon d$ of the diffraction optical element is expressed by $\upsilon d=\lambda d/(\lambda F-\lambda C)$, where $\lambda d$, $\lambda C$ and $\lambda F$ are the wavelengths of the d, C and F lines, respectively, so that there is obtained $\upsilon d=-3.45$.

The refractive power for the principal wavelength (d line) of the diffraction optical element in the paraxial first-order diffracted light is expressed by $\psi=-2\cdot C2$, where C2 is the coefficient of the term of second degree in the equation (1) for the phase of the diffraction optical element. Further, the refractive power $\psi'$ for the arbitrary wavelength is expressed by $\psi'=(\lambda/\lambda o) \cdot (-2 \cdot C2)$, where $\lambda$ is the arbitrary wavelength and $\lambda o$ is the reference wavelength (principal wavelength).

The second term $(\Sigma_{j=1}{}^n (2 \cdot C2j/3.45))$ in the inequality (2) simply represents the chromatic correction in the diffraction optical element. So, the inequality of condition (2) is for canceling out the residual chromatic aberrations of the refracting optical system by the diffraction optical system.

To more effectively carry out the correction of chromatic aberrations, it is preferable to satisfy the following condition:

$$0<|\Sigma_{j=1}{}^n (2 \cdot C2j/3.45)|-|\psi_{k=1}{}^m (\psi k/\upsilon k)| \qquad (3).$$

When the inequality of condition (3) is violated, as the residual chromatic aberrations of the refracting optical system are corrected by the diffraction optical system, either under-correction or over-correction results. So, this is no good.

Figure 11:
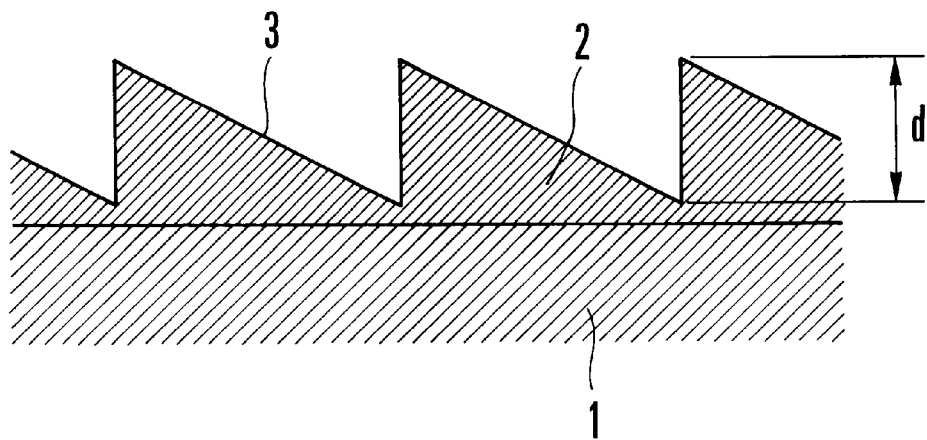
FIG. 11 is a sectional view, in enlarged scale, of a diffraction optical element.

Also, for the shape of the grooves in the diffraction optical surface in each of the embodiments, there is the kinoform as shown in FIG. 11. To make a diffraction grating of the kinoform, a layer of ultraviolet setting resin is applied on the surface of a substrate 1 to form a resin part 2, and in the resin part 2, there is formed a diffraction grating 3 having such a grating thickness "d" that the diffraction efficiency in the first-order diffracted light in a wavelength of 530 nm is 100%.

Figure 12:
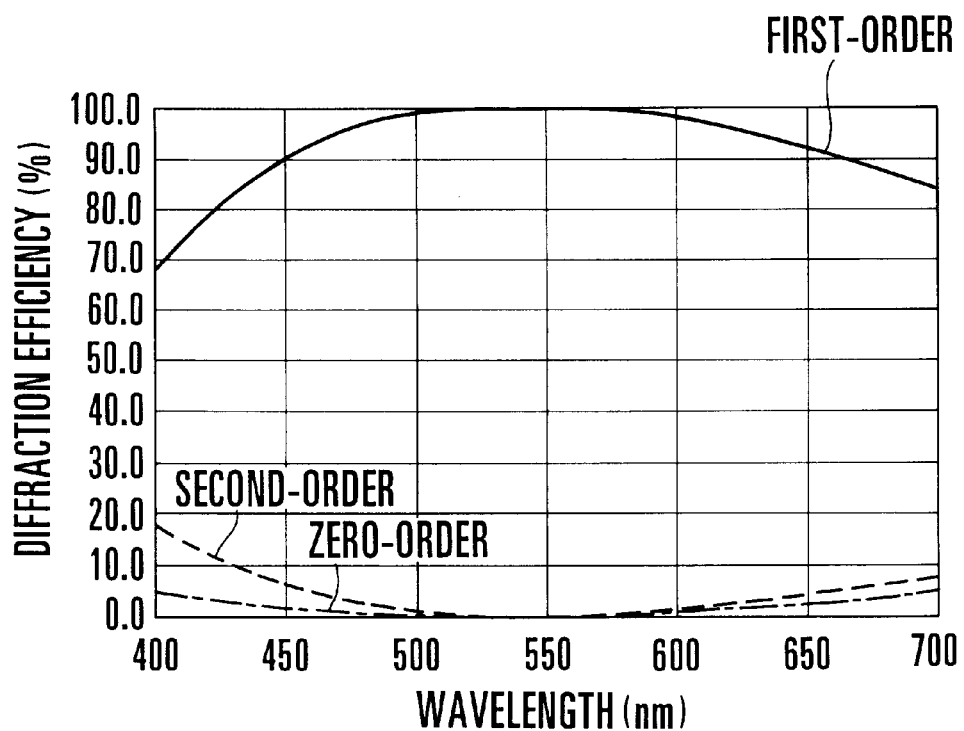
FIG. 12 is a graph showing diffraction efficiency relative to wavelengths.

FIG. 12 shows the wavelength dependent characteristic of the diffraction efficiency in the first-order diffracted light in the diffraction optical element shown in FIG. 11. As is apparent from FIG. 12, the diffraction efficiency in the design order gradually lowers as the wavelength deviates from the optimized one at 530 nm. In the meantime, the diffracted light of orders near to the design one increases. In FIG. 12, the zero-order diffracted light and the second-order diffracted light increase. This increase of the diffracted light of different orders from the design one gives rise to a flare, which in turn lowers the resolving power of the optical system.

Figure 13:
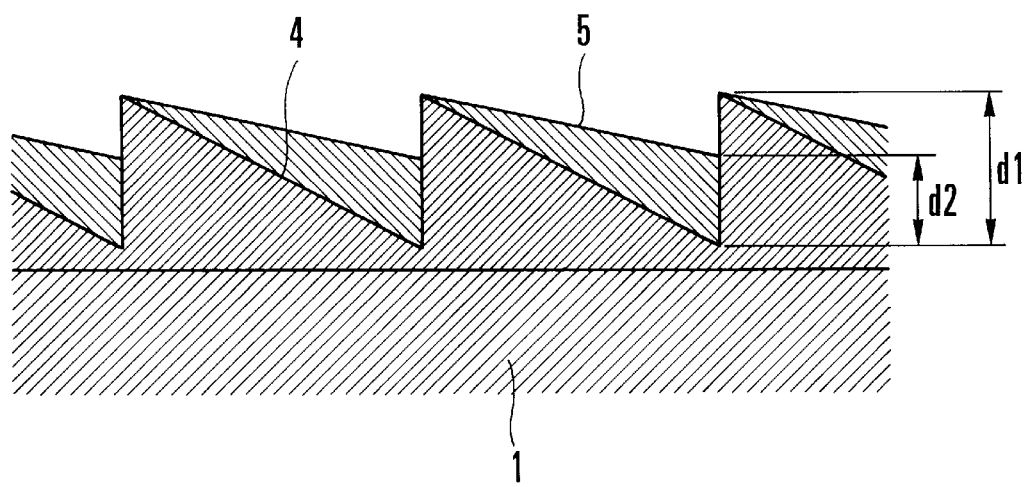
FIG. 13 is a sectional view, in enlarged scale, of a diffraction optical element having a laminated structure.

Therefore, it is preferred to employ the laminated type of diffraction optical element. As shown in FIG. 13, on the substrate 1 there are formed a first diffraction grating 4 made from an ultraviolet setting resin (Nd=1.499, $\upsilon$d=54) and, as is stacked thereon, a second diffraction grating 5 made from another ultraviolet setting resin (Nd=1.598, $\upsilon$d=28) in mating relation.

Figure 14:
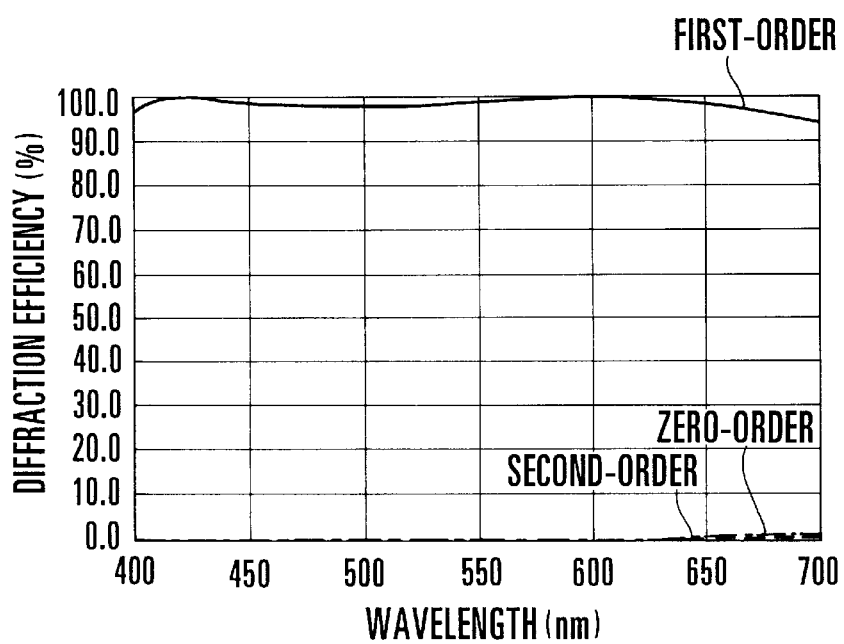
FIG. 14 is a graph showing diffraction efficiency relative to wavelengths.

For such a combination of the materials, the grating thickness d1 of the first diffraction grating 4 is determined to be 13.8 $\mu$m and the second diffraction grating 5 is stacked to a thickness d2 of 10.5 $\mu$m. The diffraction optical element of the above structure has a wavelength dependent characteristic of the diffraction efficiency in the first-order diffracted light, as shown in FIG. 14. As is apparent from FIG. 14, owing to the laminated structure, the diffraction efficiency for the design order becomes higher values than 95% over the entire useful range of wavelengths.

The use of the diffraction grating of such a laminated structure improves the resolving power in the low frequencies, giving a great advantage of obtaining a desired optical performance. By using the diffraction grating of the laminated type for the diffraction optical element in each of the embodiments, therefore, the optical performance is further improved.

It should be noted that the diffraction grating of the laminated structure described above is not confined in material to the ultraviolet setting resin. Other materials such as plastics may be used instead. Although depending on the kind of material to be used in the substrate, the first diffraction grating 4 itself may be made as the substrate.

Figure 15:
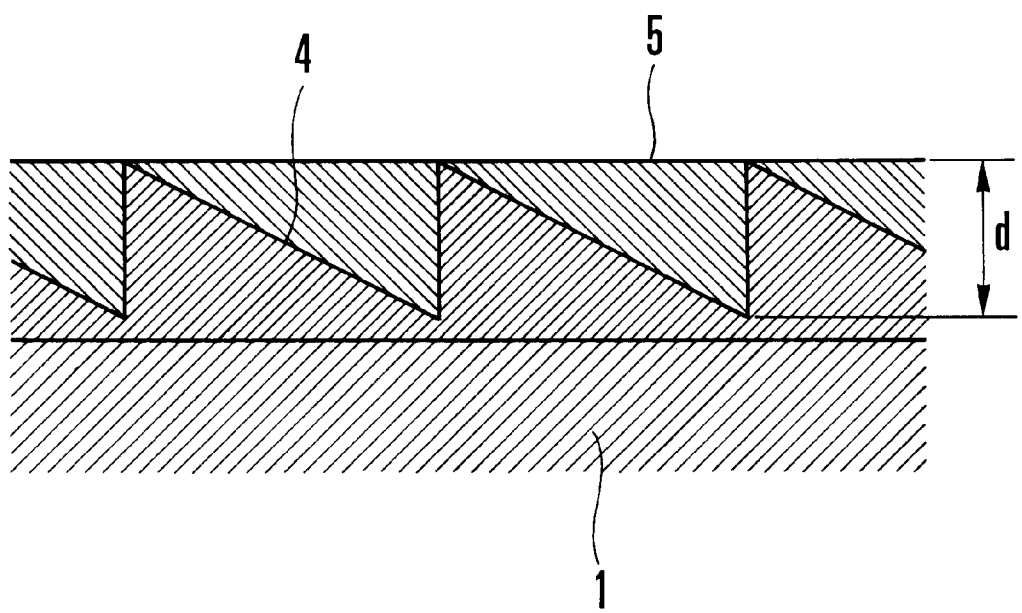
FIG. 15 is a sectional view, in enlarged scale, of another diffraction optical element having a laminated structure.

Further, there is no need to make the grating thickness differ between the first and second layers. For some combinations of materials, the grating thicknesses in the two layers may be made equal to each other as the thickness "d", as shown in FIG. 15. Since, in this case, no apparent grating spaces are formed in the surface of the diffraction optical element, the dust proof is excellent, contributing to an increase of the productivity on the assembling line in manufacturing the diffraction gratings. So, an inexpensive optical system can be obtained.

Next, eight numerical examples 1 to 8 are shown, which correspond to the embodiments 1 to 8 shown in FIGS. 3 to 10, respectively. In the numerical data for the numerical examples 1 to 8, Ri is the radius of curvature of the i-th lens surface, when counted from the object side, Di is the i-th axial lens thickness or air separation, and Ni and $\upsilon$i are respectively the refractive index and Abbe number of the material of the i-th lens element.

The aspheric coefficients K and A to E are given by the following equation:

$$X = \frac{(H^2/R)}{1+\sqrt{1-(1+K)(H/R^2)}} + AH^2 + BH^4 + CH^6 + DH^8 + EH^{10}$$

where X is the axial deviation from the vertex of the lens surface; H is the distance from the optical axis, and R is the radius of the osculating sphere.

Also, the values of the phase coefficients of up to eighth degree in the equation (1) are shown together with the values of the aspheric coefficients.

NUMERICAL EXAMPLE 1:

| Numerical Example 1: | | | |
|---|---|---|---|
| f = 4421.20 | 2$\omega$ = 55.6 | Exit Pupil Diameter $\phi$ = 8.0 | |
| *R1 = 59.162 | D1 = 1.30 | N1 = 1.491710 | $\nu$1 = 57.4 |
| R2 = 3.778 | D2 = 6.80 | | |
| R3 = Fixed Stop | D3 = 5.78 | | |
| *R4 = 10.746. | D4 = 3.70 | N2 = 1.491710 | $\nu$2 = 57.4 |
| *R5 = −4.780 | D5 = 0.17 | | |
| R6 = ∞ | D6 = 13.69 | N3 = 1.524700 | $\nu$3 = 56.2 |
| R7 = −20.000 | D7 = 1.50 | | |
| R8 = ∞ | D8 = 24.00 | N4 = 1.570900 | $\nu$4 = 33.8 |
| R9 = ∞ | D9 = 0.81 | | |
| *R10 = 27.633 | D10 = 2.35 | N5 = 1.491710 | $\nu$5 = 57.4 |
| R11 = −13.366 | D11 = 15.00 | | |
| R12 = Eye Point | | | |

*Aspheric Surface

Aspheric Coefficients:

R1: K = 1.59638 · 10$^2$   A = 0   B = 1.29316 · 10$^{-3}$
    C = −6.33288 · 10$^{-5}$   D = 1.67969 · 10$^{-6}$   E = 0
R5: K = −5.12549 · 10$^{-1}$   A = 0   B = 9.46044 · 10$^{-4}$
    C = −9.69807 · 10$^{-5}$   D = 1.02755 · 10$^{-4}$   E = 0
R10: K = 1.02530 · 10$^{-1}$   A = 0   B = −8.46894 · 10$^{-5}$
    C = −2.01808 · 10$^{-7}$   D = 0   E = 0

Phase Coefficients:

R4:   C2 = −4.22008 · 10$^{-3}$   C4 = −4.65602 · 10$^{-5}$
      C6 = −4.42580 · 10$^{-5}$   C8 = 1.83065 · 10$^{-6}$

| Numerical Example 2: | | |
|---|---|---|
| f = 4173.22 | 2ω = 55.6 | Exit Pupil Diameter φ = 8.0 |

| | | | |
|---|---|---|---|
| *R1 = 104.689 | D1 = 1.30 | N1 = 1.491710 | ν1 = 57.4 |
| R2 = 2.941 | D2 = 4.70 | | |
| R3 = Fixed Stop | D3 = 3.17 | | |
| *R4 = 9.886 | D4 = 3.70 | N2 = 1.491710 | ν2 = 57.4 |
| *R5 = −4.129 | D5 = 0.17 | | |
| R6 = ∞ | D6 = 13.69 | N3 = 1.524700 | ν3 = 56.2 |
| R7 = −20.000 | D7 = 1.50 | | |
| R8 = ∞ | D8 = 24.00 | N4 = 1.570900 | ν4 = 33.8 |
| R9 = ∞ | D9 = 0.81 | | |
| *R10 = 27.633 | D10 = 2.35 | N5 = 1.491710 | ν5 = 57.4 |
| R11 = −13.366 | D11 = 15.00 | | |
| R12 = Eye Point | | | |

*Aspheric Surface

Aspheric Coefficients:

R1: K = −5.26499 · 10$^1$  A = 0  B = 1.51439 · 10$^{-3}$
    C = −1.59974 · 10$^{-5}$  D = 2.16369 · 10$^{-6}$  E = 0
R4: K = −2.67765 · 10$^1$  A = 0  B = 1.29504 · 10$^{-3}$
    C = 1.63472 · 10$^{-4}$  D = −4.72881 · 10$^{-5}$  E = 0
R10: K = 1.02530 · 10$^{-1}$  A = 0  B = −8.46894 · 10$^{-5}$
    C = −2.01808 · 10$^{-7}$  D = 0  E = 0

Phase Coefficients:

R5: C2 = −5.21488 · 10$^{-3}$   C4 = 7.55564 · 10$^{-4}$
    C6 = −6.14140 · 10$^{-5}$   C8 = −8.33074 · 10$^{-6}$

| Numerical Example 3: | | |
|---|---|---|
| f = −48855.05 | 2ω = 55.6 | Exit Pupil Diameter φ = 8.0 |

| | | | |
|---|---|---|---|
| *R1 = 8.931 | D1 = 1.30 | N1 = 1.491710 | ν1 = 57.4 |
| *R2 = 3.332 | D2 = 4.00 | | |
| R3 = Fixed Stop | D3 = 2.83 | | |
| *R4 = 10.994 | D4 = 3.70 | N2 = 1.491710 | ν2 = 57.4 |
| *R5 = −4.436 | D5 = 0.29 | | |
| R6 = ∞ | D6 = 13.69 | N3 = 1.524700 | ν3 = 56.2 |
| R7 = −20.000 | D7 = 1.50 | | |
| R8 = ∞ | D8 = 24.00 | N4 = 1.570900 | ν4 = 33.8 |
| R9 = ∞ | D9 = 0.80 | | |
| *R10 = 27.633 | D10 = 2.35 | N5 = 1.491710 | ν5 = 57.4 |
| R11 = −13.366 | D14 = 15.00 | | |
| R12 = Eye Point | | | |

*Aspheric Surface

Aspheric coefficients:

R1: K = −2.16745 · 10$^0$  A = 0  B = 3.08491 · 10$^{-3}$
    C = −2.15513 · 10$^{-4}$  D = −2.92823 · 10$^{-5}$  E = 0
R5: K = −1.03308 · 10$^{-0}$  A = 0  B = 1.42100 · 10$^{-3}$
    C = −4.51809 · 10$^{-5}$  D = 1.24654 · 10$^{-6}$  E = 0
R10: K = 1.02530 · 10$^{-1}$  A = 0  B = −8.46894 · 10$^{-5}$
    C = −2.01808 · 10$^{-7}$  D = 0  E = 0

Phase Coefficients:

R2: C2 = −4.67996 · 10$^{-3}$   C4 = 3.09325 · 10$^{-3}$
    C6 = −6.72250 · 10$^{-4}$   C8 = −1.07600 · 10$^{-4}$
R4: C2 = −2.14316 · 10$^{-3}$   C4 = −1.97163 · 10$^{-5}$
    C6 = 8.88126 · 10$^{-6}$    C8 = −2.47331 · 10$^{-7}$

| Numerical Example 4: | | |
|---|---|---|
| f = −62245.73 | 2ω = 55.6 | Exit Pupil Diameter φ = 8.0 |

| | | | |
|---|---|---|---|
| *R1 = 9.809 | D1 = 1.30 | N1 = 1.491710 | ν1 = 57.4 |
| R2 = 3.799 | D2 = 3.64 | | |
| R3 = Fixed Stop | D3 = 4.00 | | |
| *R4 = 12.510 | D4 = 3.70 | N2 = 1.491710 | ν2 = 57.4 |
| *R5 = −5.125 | D5 = 0.57 | | |
| R6 = ∞ | D6 = 1.00 | N3 = 1.491710 | ν3 = 57.4 |
| *R7 = ∞ | D7 = 0.50 | | |
| R8 = ∞ | D8 = 13.69 | N4 = 1.524700 | ν4 = 56.2 |
| R9 = −20.000 | D9 = 1.50 | | |
| R10 = ∞ | D10 = 24.00 | N5 = 1.570900 | ν5 = 33.8 |
| R11 = ∞ | D11 = 0.80 | | |
| *R12 = 27.633 | D12 = 2.35 | N6 = 1.491710 | ν6 = 57.4 |
| R13 = −13.366 | D13 = 15.00 | | |
| R14 = Eye Point | | | |

*Aspheric Surface

Aspheric coefficients:

R1: K = −1.09315 · 10$^1$  A = 0  B = 2.41117 · 10$^{-3}$
    C = −2.38385 · 10$^{-4}$  D = 1.57103 · 10$^{-5}$  E = 0
R4: K = −9.90658  A = 0  B = 1.48879 · 10$^{-4}$
    C = −4.22557 · 10$^{-5}$  D = 2.08627 · 10$^{-6}$  E = 0
R5: K = −6.87681 · 10$^{-1}$  A = 0  B = 2.68812 · 10$^{-4}$
    C = −2.11883 · 10$^{-5}$  D = 1.10532 · 10$^{-6}$  E = 0
R12: K = 1.02530 · 10$^{-1}$  A = 0  B = −8.46894 · 10$^{-5}$
    C = −2.01808 · 10$^{-7}$  D = 0  E = 0

Phase Coefficients:

R7: C2 = −4.08837 · 10$^{-3}$   C4 = 2.71758 · 10$^{-4}$
    C6 = −1.08630 · 10$^{-5}$   C8 = 3.28603 · 10$^{-8}$

| Numerical Example 5: | | |
|---|---|---|
| f = −77892.37 | 2ω = 55.6 | Exit Pupil Diameter φ = 8.0 |

| | | | |
|---|---|---|---|
| *R1 = 10.667 | D1 = 1.30 | N1 = 1.491710 | ν1 = 57.4 |
| R2 = 3.555 | D2 = 3.64 | | |
| R3 = Fixed Stop | D3 = 4.00 | | |
| *R4 = 11.637 | D4 = 3.70 | N2 = 1.491710 | ν2 = 57.4 |
| *R5 = −5.042 | D5 = 0.57 | | |
| *R6 = ∞ | D6 = 1.00 | N3 = 1.491710 | ν3 = 57.4 |
| R7 = ∞ | D7 = 0.50 | | |
| R8 = ∞ | D8 = 13.69 | N4 = 1.524700 | ν4 = 56.2 |
| R9 = −20.000 | D9 = 1.50 | | |
| R10 = ∞ | D10 = 24.00 | N5 = 1.570900 | ν5 = 33.8 |
| R11 = ∞ | D11 = 0.80 | | |
| *R12 = 27.633 | D12 = 2.35 | N6 = 1.491710 | ν6 = 57.4 |
| R13 = −13.366 | D13 = 15.00 | | |
| R14 = Eye Point | | | |

*Aspheric Surface

Aspheric Coefficients:

R1: K = −1.06911 · 10$^1$  A = 0  B = 2.02045 · 10$^{-3}$
    C = −1.74030 · 10$^{-4}$  D = 1.18441 · 10$^{-5}$  E = 0
R4: K = −1.60133  A = 0  B = −1.06944 · 10$^{-5}$
    C = −3.14380 · 10$^{-5}$  D = 3.17951 · 10$^{-6}$  E = 0
R5: K = −5.88602 · 10$^{-1}$  A = 0  B = 6.59444 · 10$^{-4}$
    C = −2.60151 · 10$^{-5}$  D = 2.86623 · 10$^{-6}$  E = 0
R12: K = 1.02530 · 10$^{-1}$  A = 0  B = −8.46894 · 10$^{-5}$
    C = −2.01808 · 10$^{-7}$  D = 0  E = 0

Phase coefficients:

R6: C2 = −3.75905 · 10$^{-3}$   C4 = 2.61229 · 10$^{-4}$
    C6 = −1.23791 · 10$^{-5}$   C8 = 3.95917 · 10$^{-8}$

Numerical Example 6:

| f = −48910.29 | 2ω = 55.6 | Exit Pupil Diameter φ = 8.0 | |
|---|---|---|---|
| *R1 = 11.130 | D1 = 1.30 | N1 = 1.491710 | ν1 = 57.4 |
| R2 = 3.685 | D2 = 3.79 | | |
| R3 = Fixed Stop | D3 = 4.00 | | |
| *R4 = 11.209 | D4 = 3.70 | N2 = 1.491710 | ν2 = 57.4 |
| *R5 = −5.012 | D5 = 0.16 | | |
| *R6 = ∞ | D6 = 1.00 | N3 = 1.491710 | ν3 = 57.4 |
| *R7 = ∞ | D7 = 0.50 | | |
| R8 = ∞ | D8 = 13.69 | N4 = 1.524700 | ν4 = 56.2 |
| R9 = −20.000 | D9 = 1.50 | | |
| R10 = ∞ | D10 = 24.00 | N5 = 1.570900 | ν5 = 33.8 |
| R11 = ∞ | D11 = 0.80 | | |
| *R12 = 27.633 | D12 = 2.35 | N6 = 1.491710 | ν6 = 57.4 |
| R13 = −13.366 | D13 = 15.00 | | |
| R14 = Eye Point | | | |

*Aspheric Surface

Aspheric Coefficients:

R1: $K = -1.01637 \cdot 10^1$  $A = 0$  $B = 1.89060 \cdot 10^{-3}$
    $C = -1.58334 \cdot 10^{-4}$  $D = 1.15117 \cdot 10^{-5}$  $E = 0$
R4: $K = -3.54166 \cdot 10^{-1}$  $A = 0$  $B = 1.20211 \cdot 10^{-4}$
    $C = -4.96249 \cdot 10^{-5}$  $D = 2.3396 \cdot 10^{-6}$  $E = 0$
R5: $K = -5.87434 \cdot 10^{-1}$  $A = 0$  $B = 9.28063 \cdot 10^{-4}$
    $C = -2.70017 \cdot 10^{-5}$  $D = 2.21565 \cdot 10^{-6}$  $E = 0$
R12: $K = 1.02530 \cdot 10^{-1}$  $A = 0$  $B = -8.46894 \cdot 10^{-5}$
     $C = -2.01808 \cdot 10^{-7}$  $D = 0$  $E = 0$ Phase Coefficients:

R6: $C2 = -3.73706 \cdot 10^{-3}$  $C4 = 1.87830 \cdot 10^{-4}$
    $C6 = -3.08445 \cdot 10^{-5}$  $C8 = -3.48661 \cdot 10^{-7}$
R7: $C2 = 1.62750 \cdot 10^{-4}$  $C4 = 1.14820 \cdot 10^{-4}$
    $C6 = 1.07176 \cdot 10^{-5}$  $C8 = 1.04286 \cdot 10^{-6}$ Numerical Example 7:

| f = 7891.74 | 2ω = 55.6 | Exit Pupil Diameter φ = 8.0 | |
|---|---|---|---|
| *R1 = 8.833 | D1 = 1.30 | N1 = 1.491710 | ν1 = 57.4 |
| R2 = 3.406 | D2 = 4.00 | | |
| R3 = ∞ | D3 = 3.38 | | |
| *R4 = 12.122 | D4 = 3.70 | N2 = 1.491710 | ν2 = 57.4 |
| *R5 = −4.687 | D5 = 1.74 | | |
| R6 = ∞ | D6 = 13.69 | N3 = 1.524700 | ν3 = 56.2 |
| *R7 = −20.000 | D7 = 1.50 | | |
| R8 = ∞ | D6 = 24.00 | N4 = 1.570900 | ν4 = 33.8 |
| R9 = ∞ | D9 = 0.80 | | |
| *R10 = 27.633 | D10 = 2.35 | N5 = 1.491710 | ν5 = 57.4 |
| R11 = −13.366 | D11 = 15.00 | | |
| R12 = Eye Point | D12 = 0.00 | | |

*Aspheric Surface

Aspheric Coefficients:

R1: $K = -1.12926 \cdot 10^1$  $A = 0$  $B = 2.07521 \cdot 10^{-3}$
    $C = -3.43894 \cdot 10^{-5}$  $D = 6.32235 \cdot 10^{-8}$  $E = 0$
R4: $K = -1.92334 \cdot 10^1$  $A = 0$  $B = 6.79073 \cdot 10^{-4}$
    $C = -1.29333 \cdot 10^{-5}$  $D = 1.71868 \cdot 10^{-6}$  $E = 0$
R5: $K = -7.67453 \cdot 10^1$  $A = 0$  $B = 1.05929 \cdot 10^{-3}$
    $C = -2.35408 \cdot 10^{-5}$  $D = 1.98857 \cdot 10^{-6}$  $E = 0$
R10: $K = 1.02530 \cdot 10^1$  $A = 0$  $B = -8.46894 \cdot 10^{-5}$
     $C = -2.01808 \cdot 10^{-7}$  $D = 0$  $E = 0$ Phase Coefficients:

R7: $C2 = -8.93930 \cdot 10^{-3}$  $C4 = -3.49234 \cdot 10^{-5}$
    $C6 = -5.18434 \cdot 10^{-8}$  $C8 = -9.97089 \cdot 10^{-11}$ Numerical Example 8:

| f = 11658.22 | 2ω = 55.6 | Exit Pupil Diameter φ = 8.0 | |
|---|---|---|---|
| *R1 = 8.634 | D1 = 1.30 | N1 = 1.491710 | ν1 = 57.4 |
| R2 = 3.252 | D2 = 2.00 | | |
| R3 = Fixed Stop | D3 = 1.00 | | |
| *R4 = ∞ | D4 = 1.00 | N2 = 1.491710 | ν2 = 57.4 |
| R5 = ∞ | D5 = 1.56 | | |
| *R6 = 10.104 | D6 = 3.70 | N3 = 1.491710 | ν3 = 57.4 |
| *R7 = −4.404 | D7 = 0.20 | | |
| R8 = ∞ | D8 = 13.69 | N4 = 1.524700 | ν4 = 56.2 |
| R9 = −20.000 | D9 = 1.50 | | |
| R10 = ∞ | D10 = 24.00 | N5 = 1.570900 | ν5 = 33.8 |
| R11 = ∞ | D11 = 0.80 | | |
| R12 = 27.633 | D12 = 2.35 | N6 = 1.491710 | ν6 = 57.4 |
| R13 = −13.366 | D13 = 15.00 | | |
| R14 = Eye Point | | | |

*Aspheric Surface

Aspheric Coefficients:

R1: $K = -1.41148$  $A = 0$  $B = 1.26575 \cdot 10^{-3}$
    $C = -1.86444 \cdot 10^{-4}$  $D = -1.01106 \cdot 10^{-5}$  $E = 0$
R6: $K = -1.12848 \cdot 10^1$  $A = 0$  $B = 1.52094 \cdot 10^{-3}$
    $C = 2.71771 \cdot 10^{-6}$  $D = 1.85623 \cdot 10^{-6}$  $E = 0$
R7: $K = -9.89707 \cdot 10^{-1}$  $A = 0$  $B = 1.30952 \cdot 10^{-3}$
    $C = -6.12826 \cdot 10^{-5}$  $D = 7.60363$  $E = 0$
R12: $K = 1.02530 \cdot 10^{-1}$  $A = 0$  $B = -8.46894 \cdot 10^{31\,5}$
     $C = -2.01808 \cdot 10^{-7}$  $D = 0$  $E = 0$ Phase Coefficients:

R4: $C2 = -6.81258 \cdot 10^{-3}$  $C4 = 3.74344 \cdot 10^{-5}$
    $C6 = 5.31636 \cdot 10^{-5}$  $C8 = -1.57034 \cdot 10^{-5}$ The values of the factors in the conditions (2) and (3) for the numerical examples 1 to 8 are listed in the following table.

| Numerical Example No. | Condition No. (2) | (3) |
|---|---|---|
| 1 | $-1.80 \cdot 10^{-6}$ | 0.00170 |
| 2 | $-100 \cdot 10^{-6}$ | 0.00269 |
| 3 | $-5.80 \cdot 10^{-6}$ | 0.00248 |
| 4 | $-3.30 \cdot 10^{-6}$ | 0.00099 |
| 5 | $-2.60 \cdot 10^{-6}$ | 0.00097 |
| 6 | $-2.70 \cdot 10^{-6}$ | 0.00079 |
| 7 | $-7.20 \cdot 10^{-6}$ | 0.00379 |
| 8 | $-7.10 \cdot 10^{-6}$ | 0.00215 |

The aberrations of the numerical examples 1 to 8 of viewfinder optical systems are shown in FIGS. 16A to 16D through FIGS. 23A to 23D, respectively, where g, d, C and F are the spectral g-line, d-line, C-line and F-line, and Δ-M is the meridional focus and AS is the sagittal focus.

Figure 24:
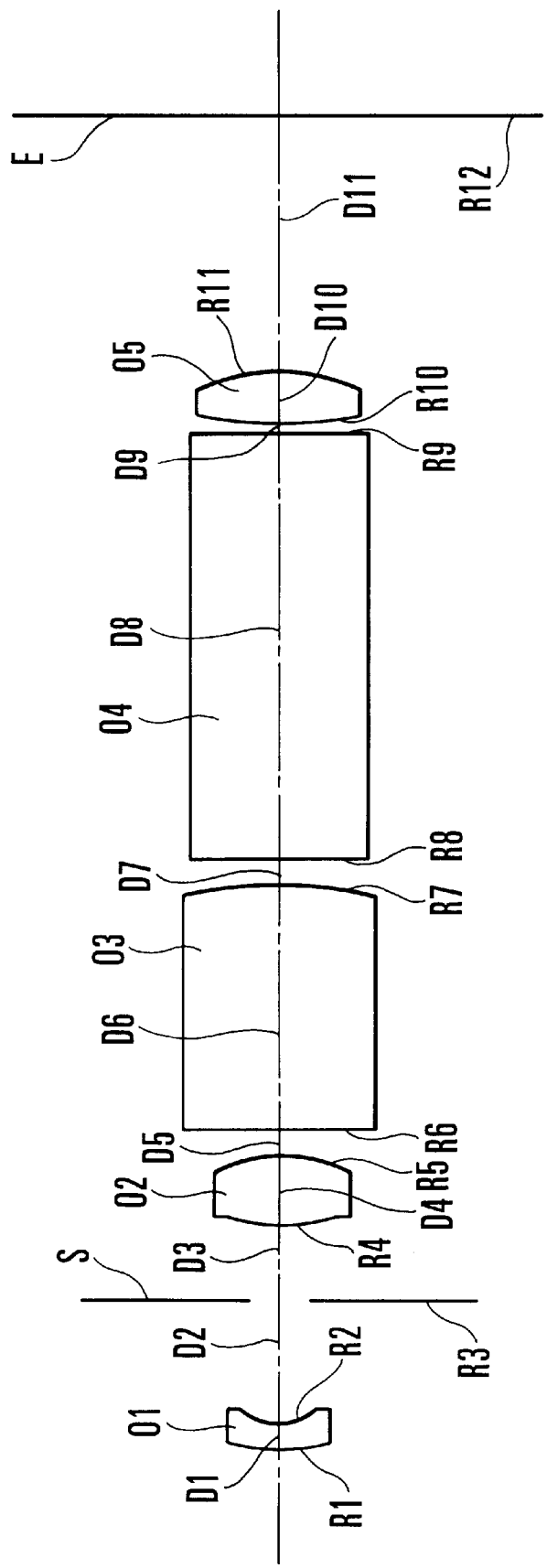
FIG. 24 is a schematic diagram of a viewfinder optical system which has no diffraction optical surface.
Figure 25:
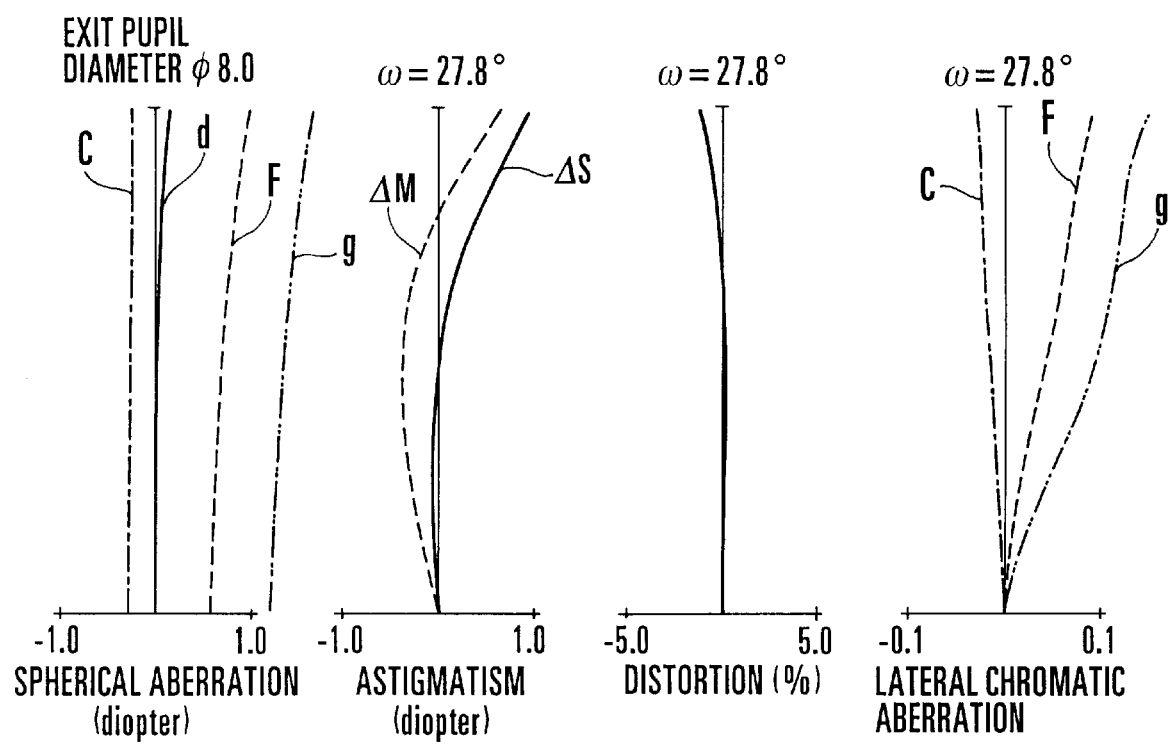
FIGS. 25A to 25D are graphic representations of the aberrations in the viewfinder optical system shown in FIG. 24.

FIG. 24 shows a real-image finder which is similar in construction to the embodiments 1 to 8, but different in not making use of the diffraction optical surface or surfaces. The following table is the numerical data of this conventional example. Its aberrations are shown in FIGS. 25A to 25D.

Conventional Example 1:

| f = 4421.20 | 2ω = 55.6 | Exit Pupil Diameter φ = 8.0 |
| --- | --- | --- |
| *R1 = 59.162 | D1 = 1.30 | N1 = 1.491710  v1 = 57.4 |
| R2 = 3.778 | D2 = 6.80 | |
| R3 = Fixed Stop | D3 = 5.78 | |
| *R4 = 10.746 | D4 = 3.70 | N2 = 1.491710  v2 = 57.4 |
| *R5 = 10.746 | D5 = 0.17 | |
| R6 = ∞ | D6 = 13.69 | N3 = 1.524700  v3 = 56.2 |
| R7 = −20.000 | D7 = 1.50 | |
| R8 = ∞ | D8 = 24.00 | N4 = 1.570900  v4 = 33.8 |
| R9 = ∞ | D9 = 0.81 | |
| *R10 = 27.633 | D10 = 2.35 | N5 = 1.491710  v5 = 57.4 |
| R11 = −−13.366 | D11 = 15.00 | |
| R12 = Eye Point | | |

*Aspheric Surface

Aspheric Coefficients:

R1:    K = 1.59638.102    A = 0    B = 1.29316 · 10$^{-3}$
     C = −6.33288 · 10$^{-5}$   D = 1.67969 · 10$^{-6}$   E = 0
R4:    K = −1.02447
R5:    K = −5.12549 · 10$^{-1}$   A = 0    B = 9.46044 · 10$^{-4}$
     C = −9.69807 · 10$^{-5}$   D = 1.02755 · 10$^{-5}$   E = 0
R10:   K = 1.02530 · 10$^{-1}$   A = 0    B = −8.46894 · 10$^{-5}$
     C = −2.01808 · 10$^{-7}$   D = 0    E = 0

The aberration curves shown in FIGS. 25A to 25D, as are apparent on comparison with those in FIGS. 16A to 16D through FIGS. 23A to 23D of the embodiments 1 to 8, are inferior to those of the systems having the diffraction optical surface in the optical element. With respect to the lateral chromatic aberration, extreme deterioration results in the conventional example.

Next, three embodiments 9 to 11 different from the above-described embodiments 1 to 8 are described below.

Figure 26:
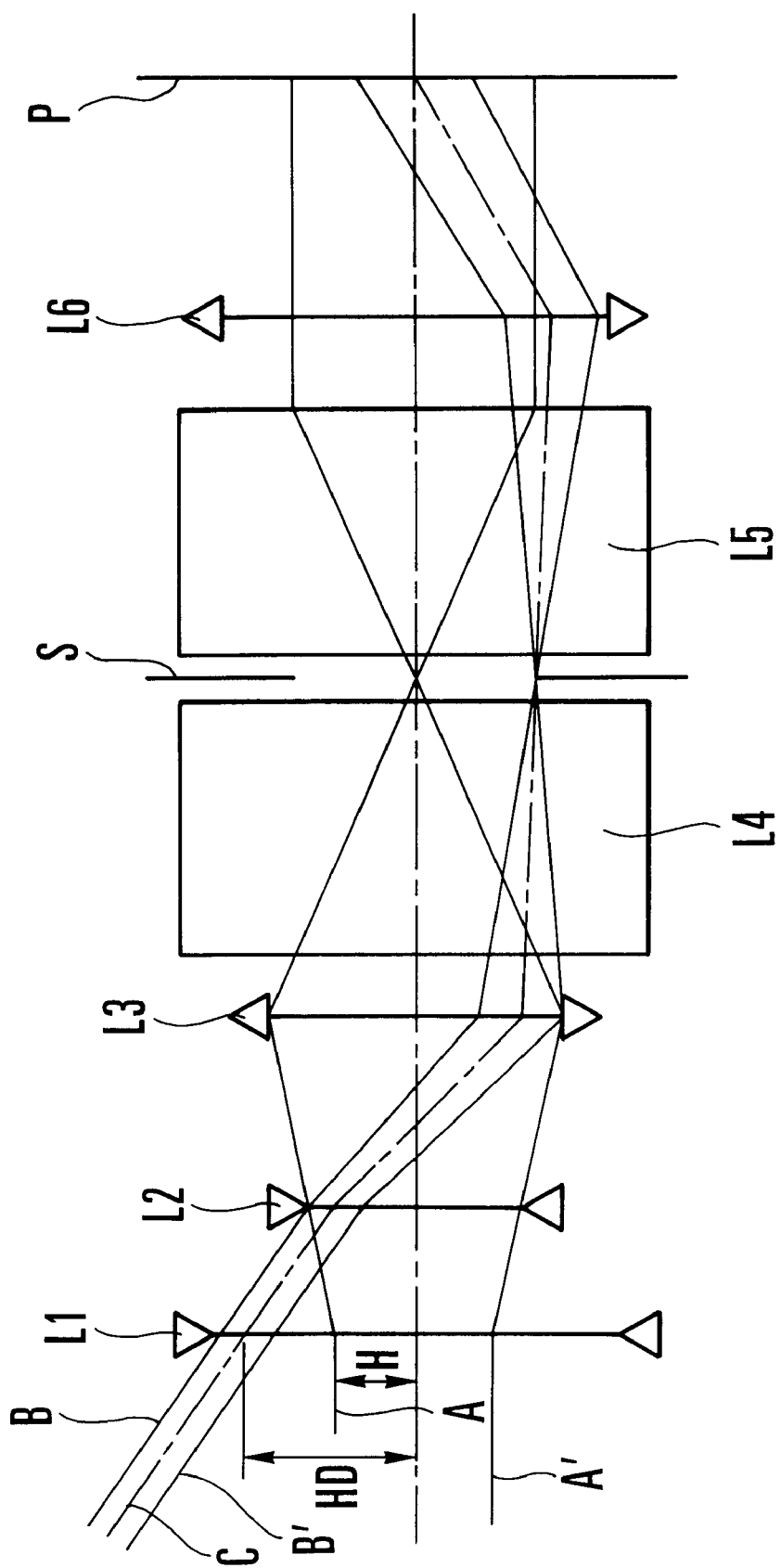
FIG. 26 is a schematic diagram showing the construction of a viewfinder optical system according to each of embodiments 9 to 11 of the invention.

FIG. 26 schematically shows the construction and arrangement of the constituent parts of a real-image viewfinder. In the viewfinder, there are disposed a first lens unit L1, a second lens unit L2, a third lens unit L3, a first image inverting optical member L4, a field stop S, a second image inverting optical member L5 and an eye-piece lens unit L6 in this order from the object side. In FIG. 26, P is assumed to be an eye point. A and A' indicate a bundle of on-axial rays. B and B' indicate a bundle of rays whose maximum field angle is determined by a member for limiting the passage of light such as the field stop S, or a marking for defining the field of view, positioned at or near the primary image plane. A principal ray C halves the bundle of rays indicated by B and B' on the meridional section. The rays from the primary image plane are made almost parallel by the eye-piece lens unit L6.

In this instance, according to the embodiments 9 to 11, letting the distance of the maximum zone in the on-axial bundle of rays (A, A') from the optical axis be denoted by H, and the distance from the optical axis of the principal ray C which halves the off-axial bundle of rays having an effective maximum field angle be denoted by HD, a diffraction optical surface is disposed in a lens unit which satisfies the following condition:

$$|HD''|>|H| \qquad (4).$$

When the diffraction optical surface lies within this range, the angles of incidence of the on-axial and off-axial bundles on the diffraction optical surface can be varied in such a manner as to minimize the size of common working area. For any field angle, therefore, the lateral chromatic aberration resulting from the variation of the image magnification in each wavelength with the angle of incidence is corrected without giving too much influence to the ones for the other field angles. It is thus made possible to advantageously correct the lateral chromatic aberration.

Figure 27:
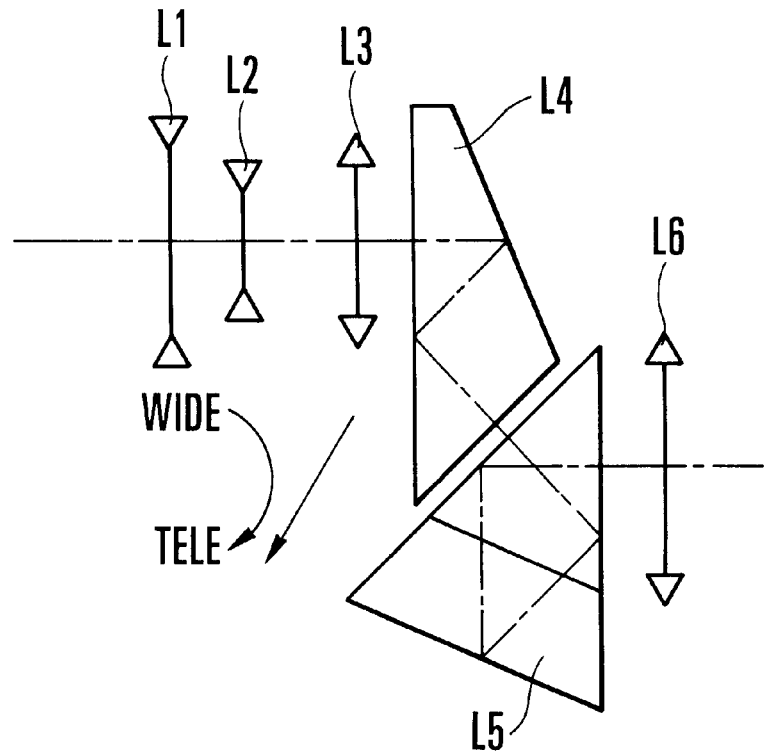
FIG. 27 is a schematic diagram of the arrangement of prisms for image inversion with a thin lens system.
Figure 28:
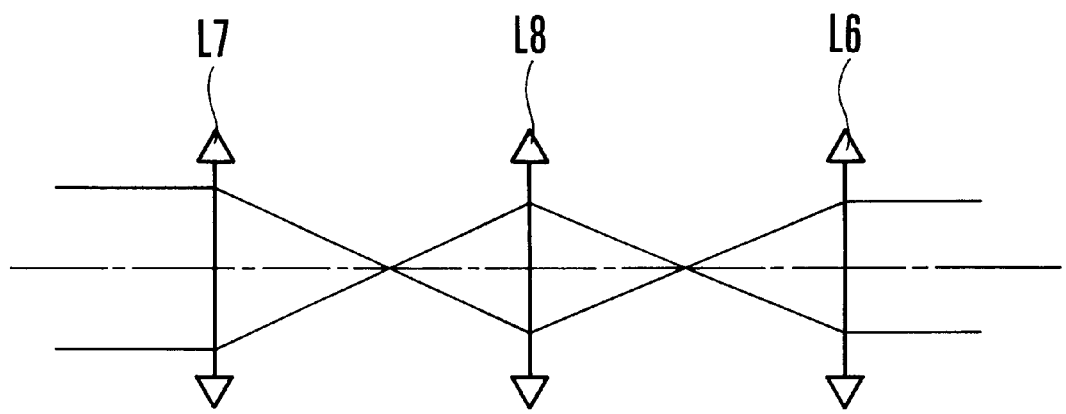
FIG. 28 is a schematic diagram showing a secondary image forming type of real-image viewfinder.

The image inverting optical members L4 and L5 L4 take the form of a Pechan roof prism like that shown in FIG. 27, but may otherwise be constructed with a Porro-prism or like other forms of prisms, or with mirrors. The real-image viewfinder may otherwise be formed also to the secondary image type, as schematically shown in FIG. 28, comprising an objective lens unit L7 for varying the image magnification, an image re-forming lens unit L8 for varying the image magnification and an eye-piece lens unit L6.

Figure 29:
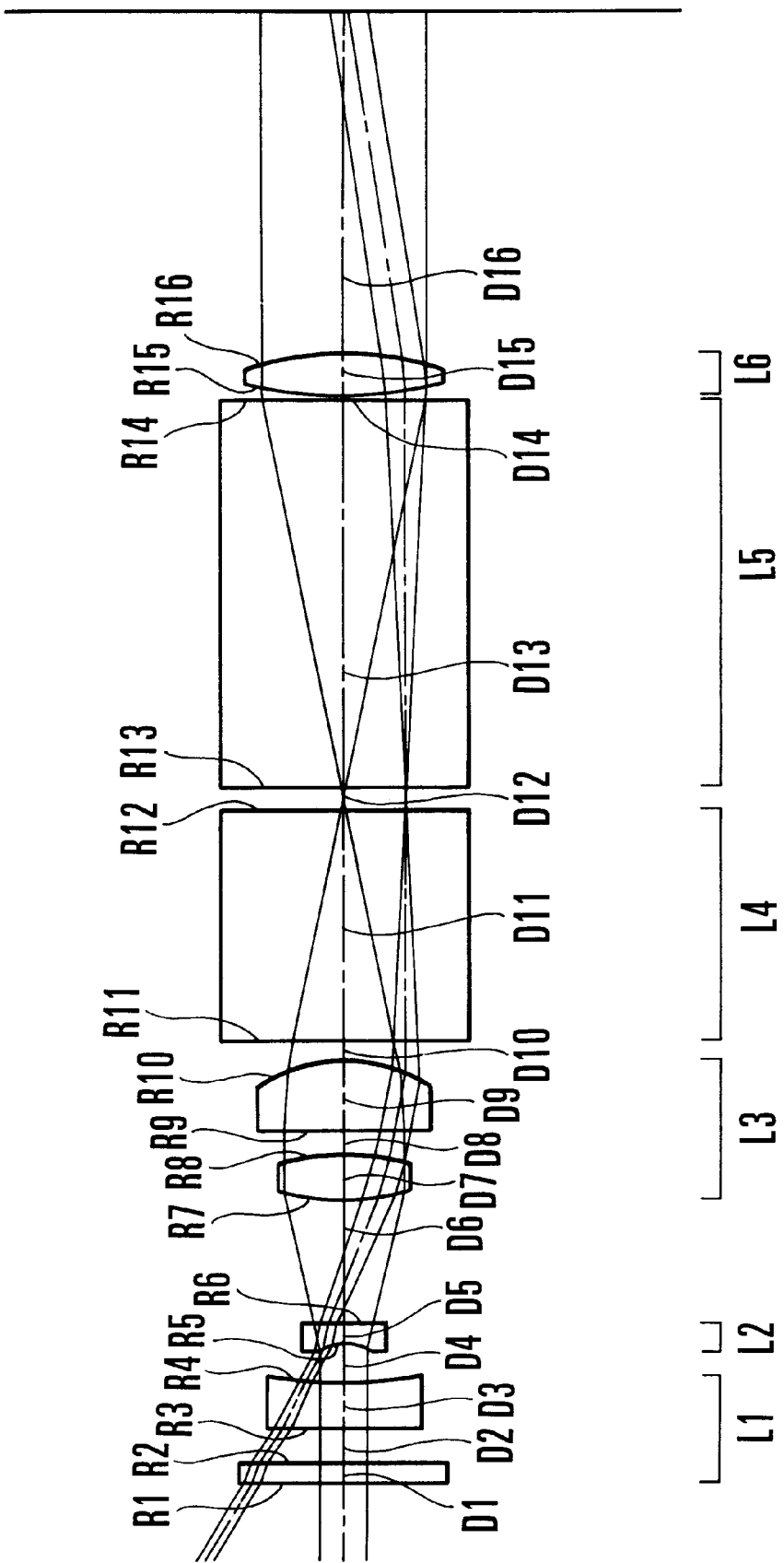
FIG. 29 is a longitudinal section view of the embodiment 9.
Figure 30:
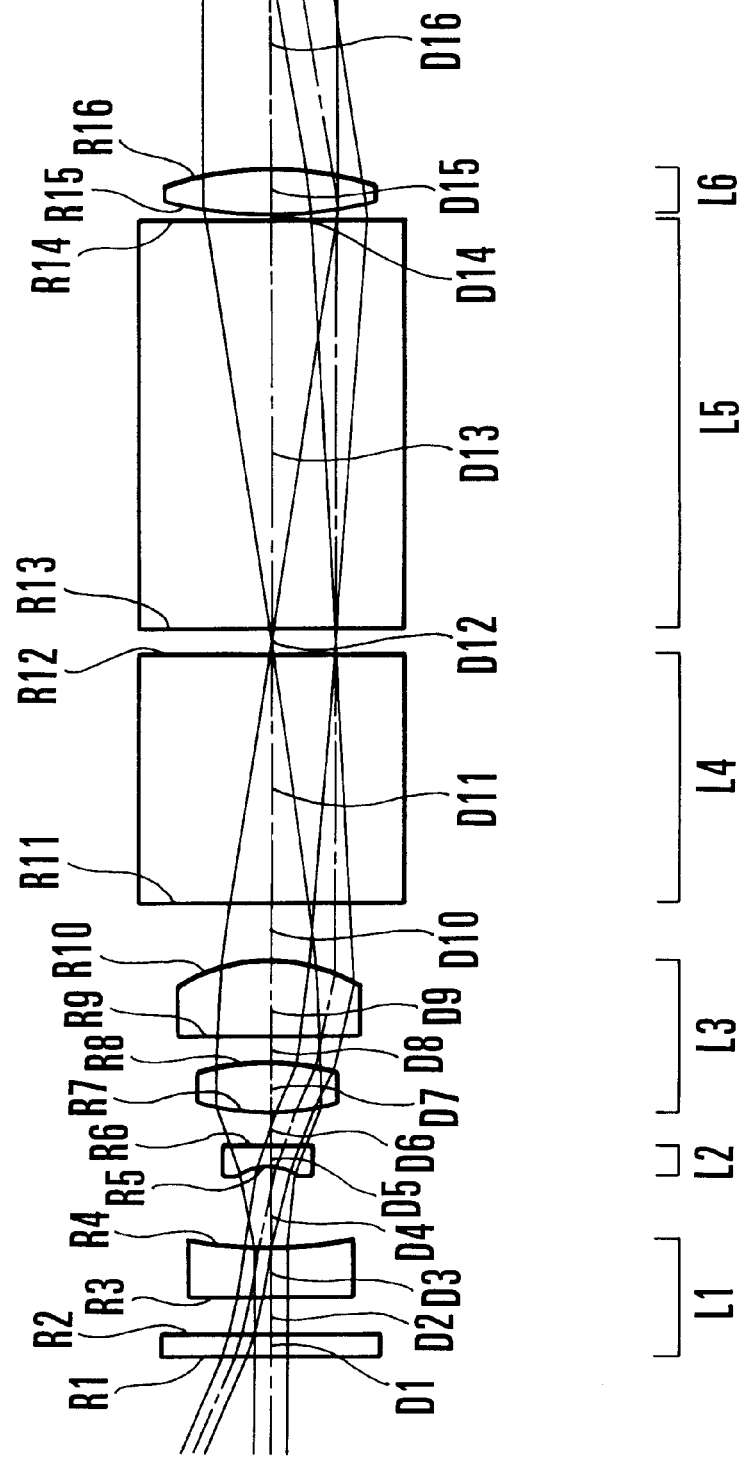
FIG. 30 is a longitudinal section view of the embodiment 10.
Figure 31:
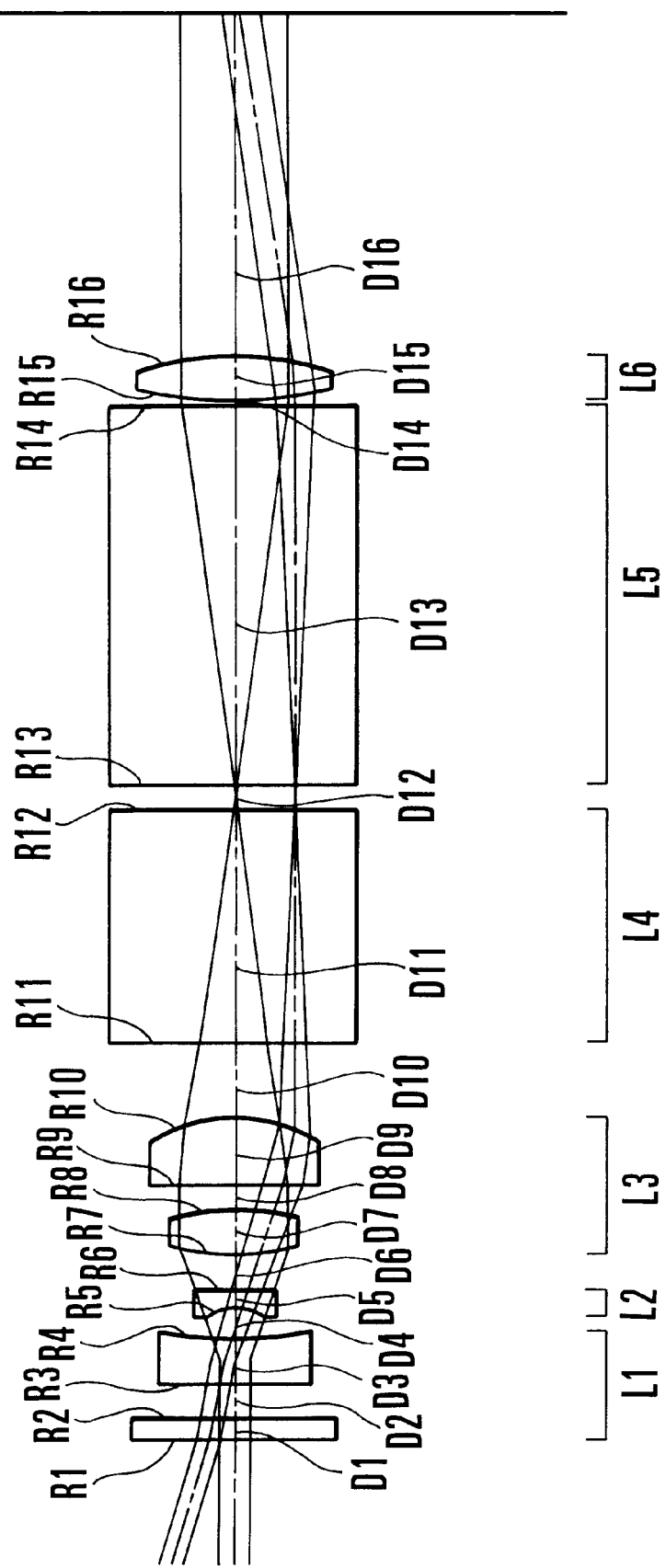
FIG. 31 is a longitudinal section view of the embodiment 11.

FIGS. 29 to 31 in lens block diagrams show the embodiments 9 to 11, respectively, in the wide-angle end, a middle focal length position and the telephoto end, with the image inverting optical members L4 and L5 in the developed form. The objective optical system comprises, in order from the object side, a negative first lens unit L1, a negative second lens unit L2 and a positive third lens unit L3. During zooming from the wide-angle end to the telephoto end, while the first lens unit L1 remains stationary on the optical axis, the second and third lens units L2 and L3 move axially in such relation that the air separation therebetween narrows.

In the embodiment 9, the front surface of a rear lens in the first lens unit L1, the front surface of a front lens and the front surface of a rear lens in the third lens unit L3, and the front surface of the eye-piece lens unit L6 are formed to aspheric shapes. The frontmost surface of the first lens unit L1 is provided with a diffraction optical surface.

In the embodiment 10, four aspheric surfaces are used at similar locations to those of the embodiment 9. A diffraction optical surface is provided on the rear surface of the front lens in the first lens unit L1.

In the embodiment 11, aspheric surfaces are applied to the front surface of the rear lens in the first lens unit L1, the front surface of the rear lens in the third lens unit L3, and the front surface of the eye-piece lens unit L6. A diffraction optical surface is provided on the front surface of the rear lens in the first lens unit L1.

Under the condition of the inequality (4) described above, determination of a location for the diffraction optical surface is made in order to insure that the features of the diffraction optical element are utilized in producing an optical system for the viewfinder which is corrected particularly well for, among other aberrations that determine whether the image looked through the viewfinder by the naked eye is good or bad, chromatic aberrations, especially lateral one, without increasing the number of constituent lens elements.

It is also preferable that, letting the paraxial refractive power of a lens $L_h$ having a diffraction optical surface be denoted by ψh, and the coefficient of the term of second degree in the equation (1) for the diffraction optical surface be denoted by C2h, the following condition is satisfied:

$$\psi h \cdot C2h < 0 \qquad (5).$$

The inequality (5) is a condition for correcting chromatic aberrations well. Since the diffraction optical element of rotational symmetry has an Abbe number υd of negative sign as described before, the coefficient in the second degree of the diffraction optical surface of the lens $L_h$ is made to take the reverse sign to that of the combined refractive power of the lens $L_h$ and the diffraction optical surface, so that the chromatic aberrations are corrected advantageously. So, it is desirable to correct the chromatic aberrations the lens $L_h$ produces, in such a manner as described above.

Incidentally, even in the embodiments 9 to 11, it is preferred to satisfy the conditions (2) and (3).

The viewfinder which satisfies the condition (4) is not confined to this type of real-image viewfinder. It is to be understood that the invention is applicable to many other types of zoom or mono-focal length viewfinders with production of similar advantages.

Although, in the embodiments 9 to 11, the diffraction optical surface is used in the objective lens system, it may be used in the eye-piece lens system or the image inverting optical system. Even in this case, an improved optical performance can be expected. Another diffraction optical surface may be likewise added to one of the other lens surfaces in the objective lens system. In this case, even more improved results can be attained.

Next, three numerical examples 9 to 11 are shown, which correspond to the embodiments 9 to 11, respectively. In the numerical data for the examples 9 to 11, Ri is the radius of curvature of the i-th lens surface, when counted from the object side, Di is the i-th axial lens thickness or air separation, and Ni and $\upsilon i$ are respectively the refractive index and Abbe number of the material of the i-th lens element.

Numerical Example 9:

f $-$ 152019.03~$-$5604.63   2$\omega$ = 62°~30°   Exit Pupil Diameter $\phi$ 32 8.8~4.8

| | | | |
|---|---|---|---|
| R1 = $\infty$ | D1 = 1.40 | N1 = 1.491710 | $\nu$1 = 57.4 |
| R2 = $\infty$ | D2 = 1.85 | | |
| R3 = $\infty$ | D3 = 3.00 | N2 = 1.491710 | $\nu$2 = 57.4 |
| R4 = 19.626 | D4 = Variable | | |
| R5 = $-$4.322 | D5 = 1.30 | N3 = 1.49171D | $\nu$3 = 57.4 |
| R6 = $-$21.358 | D6 = Variable | | |
| R7 = 11.599 | D7 = 2.80 | N4 = 1.491710 | $\nu$4 = 57.4 |
| R8 = $-$12.444 | D8 = 1.53 | | |
| R9 = $\infty$ | D9 = 4.20 | N5 = 1.491710 | $\nu$5 = 57.4 |
| R10 = $-$7.964 | D10 = Variable | | |
| R11 = $\infty$ | D11 = 14.50 | N6 = 1.570900 | $\nu$6 = 33.8 |
| R12 = $\infty$ | D12 = 1.50 | | |
| R13 = $\infty$ | D13 = 24.00 | N7 = 1.570900 | $\nu$7 = 33.8 |
| R14 = $\infty$ | D14 = 0.20 | | |
| R15 = 27.633 | D15 = 2.50 | N8 = 1.491710 | $\nu$8 = 57.4 |
| R16 = $-$12.281 | D16 = 15.00 | | |
| R17 = Eye Point | | | |

| Variable Separation | Focal Length | | |
|---|---|---|---|
| | 152019.93 | $-$9987.36 | $-$5604.63 |
| D4 | 2.39 | 3.54 | 2.34 |
| D6 | 7.52 | 2.69 | 0.89 |
| D10 | 1.35 | 5.03 | 8.04 |

Aspheric Coefficients:

| | | | |
|---|---|---|---|
| R3: | K = 0 | A = 0 | B = 7.86283.10 |
| | C = $-$2.35476 $\cdot$ 10$^{-5}$ | D = 9.26607 $\cdot$ 10$^{-7}$ | E = 0 |
| R7: | K = 0 | A = 0 | B = $-$1.23089 $\cdot$ 10$^{-4}$ |
| | C = $-$6.88633 $\cdot$ 10$^{-6}$ | D = 4.95196 $\cdot$ 10$^{-8}$ | E = 0 |
| R9: | K = 0 | A = 0 | B = $-$8.15588 $\cdot$ 10$^{-4}$ |
| | C = $-$9.81455 $\cdot$ 10$^{-7}$ | D = 0 | E = 0 |
| R15: | K = 0 | A = 0 | B = $-$9.65364 $\cdot$ 10$^{-5}$ |
| | C = $-$9.11764 $\cdot$ 10$^{-8}$ | D = 0 | E = 0 |

Phase Coefficients:

| | | |
|---|---|---|
| R1: | C2 = 2.30070 $\cdot$ 10$^{-11}$ | C4 = 4.71032 $\cdot$ 10$^{-5}$ |
| | C6 = 5.65911 $\cdot$ 10$^{-7}$ | C8 = $-$2.06028 $\cdot$ 10$^{-8}$ |

Numerical Example 10:

f = 152015.95~$-$5604.63   2$\omega$ = 62°~30°   Exit Pupil Diameter $\phi$ = 8.8~4.8

| | | | |
|---|---|---|---|
| R1 = $\infty$ | D1 = 1.40 | N1 = 1.491710 | $\nu$1 = 57.4 |
| R2 = $\infty$ | D2 = 1.85 | | |
| R3 = $\infty$ | D3 = 3.00 | N2 = 1.491710 | $\nu$2 = 57.4 |
| R4 = 19.626 | D4 = Variable | | |
| R5 = $-$4.322 | D5 = 1.30 | N3 = 1.491710 | $\nu$3 = 57.4 |
| R6 = $-$21.358 | D6 = Variable | | |
| R7 = 11.599 | D7 = 2.80 | N4 = 1.491710 | $\nu$4 = 57.4 |
| R8 = $-$12.444 | D8 = 1.53 | | |
| R9 = $\infty$ | D9 = 4.20 | N5 = 1.491710 | $\nu$5 = 57.4 |
| R10 = $-$7.964 | D10 = Variable | | |
| R11 = $\infty$ | D11 = 14.50 | N6 = 1.570900 | $\nu$6 = 33.8 |
| R12 = $\infty$ | D12 = 1.50 | | |
| R13 = $\infty$ | D13 = 24.00 | N7 = 1.570900 | $\nu$7 = 33.8 |
| R14 = $\infty$ | D14 = 0.20 | | |
| R15 = 27.633 | D15 = 2.50 | N8 = 1.491710 | $\nu$8 = 57.4 |
| R16 = $-$12.281 | D16 = 15.00 | | |
| R17 = Eye Point | | | |

| Variable Separation | Focal Length | | |
|---|---|---|---|
| | 152015.95 | $-$9987.37 | $-$5604.63 |
| D4 | 2.39 | 3.54 | 2.33 |
| D6 | 7.52 | 2.69 | 0.89 |
| D10 | 1.35 | 5.03 | 8.04 |

Aspheric Coefficients:

| | | | |
|---|---|---|---|
| R3: | K = 0 | A = 2.01093 $\cdot$ 10$^{-7}$ | B = 5.69397 $\cdot$ 10$^{-4}$ |
| | C = $-$3.55099 $\cdot$ 10$^{-6}$ | D = 4.67785 $\cdot$ 10$^{-7}$ | E = 0 |
| R7: | K = 0 | A = 0 | B = $-$1.23089 $\cdot$ 10$^{-4}$ |
| | C = $-$6.88633 $\cdot$ 10$^{-6}$ | D = 4.95196 $\cdot$ 10$^{-8}$ | E = 0 |
| R9: | K = 0 | A = 0 | B = $-$8.15588 $\cdot$ 10$^{-4}$ |
| | C = $-$9.81455 $\cdot$ 10$^{-7}$ | D = 0 | E = 0 |
| R15: | K = 0 | A = 0 | B = $-$9.65364 $\cdot$ 10$^{-5}$ |
| | C = $-$9.11764 $\cdot$ 10$^{-8}$ | D = 0 | E = 0 |

Phase Coefficients:

| | | |
|---|---|---|
| R2: | C2 = 9.91000 $\cdot$ 10$^{-8}$ | C4 = $-$2.61282 $\cdot$ 10$^{-5}$ |
| | C6 = 5.55894 $\cdot$ 10$^{-6}$ | C8 = $-$1.07282 $\cdot$ 10$^{-7}$ |

Numerical Example 11:

f = 152019.38~$-$5604.63   2$\omega$ = 62°~30°   Exit Pupil Diameter $\phi$ 32 8.8~4.8

| | | | |
|---|---|---|---|
| R1 = $\infty$ | D1 = 1.40 | N1 = 1.491710 | $\nu$1 = 57.4 |
| R2 = $\infty$ | D2 = 1.85 | | |
| R3 = $\infty$ | D3 = 3.00 | N2 = 1.491710 | $\nu$2 = 57.4 |
| R4 = 19.626 | D4 = Variable | | |
| R5 = $-$4.322 | D5 = 1.30 | N3 = 1.491710 | $\nu$3 = 57.4 |
| R6 = $-$21.358 | D6 = Variable | | |

-continued

Numerical Example 11:

f = 152019.38~−5604.63   2ω = 62°~30°   Exit Pupil Diameter φ 32 8.8~4.8

| | | |
|---|---|---|
| R7 = 11.599 | D7 = 2.80 | N4 = 1.491710  v4 = 57.4 |
| R8 = −12.444 | D8 = 1.53 | |
| R9 = ∞ | D9 = 4.20 | N5 = 1.491710  v5 = 57.4 |
| R10 = −7.964 | D10 = Variable | |
| R11 = ∞ | D11 = 14.50 | N6 = 1.570900  v6 = 33.8 |
| R12 = ∞ | D12 = 1.50 | |
| R13 = ∞ | D13 = 24.00 | N7 = 1.570900  v7 = 33.8 |
| R14 = ∞ | D14 = 0.20 | |
| R15 = 27.633 | D15 = 2.50 | N8 = 1.491710  v8 = 57.4 |
| R16 = −12.281 | D16 = 15.00 | |
| R17 = Eye Point | | |

| Variable Separation | Focal Length | | |
|---|---|---|---|
| | 152019.28 | −9987.35 | −5604.63 |
| D4 | 2.39 | 3.54 | 2.33 |
| D6 | 7.52 | 2.69 | 0.89 |
| D10 | 1.35 | 5.03 | 8.04 |

Aspheric Coefficients:

R3:   K = 0   A = 0   B = −1.62237 · $10^{-4}$
      C = −7.05311 · $10^{-6}$   D = 5.88948 · $10^{-8}$   E = 0
R9:   K = 0   A = 0   B = −7.37946 · $10^{-4}$
      C = −1.16001 · $10^{-5}$   D = 7.47669 · $10^{-7}$   E = 0
R15:  K = 0   A = 0   B = −9.65364 · $10^{-5}$
      C = −9.11764 · $10^{-8}$   D = 0   E = 0

Phase Coefficients:

R3:   C2 = 6.38228 · $10^{-12}$   C4 = 5.27204 · $10^{-5}$
      C6 = −1.51650 · $10^{-7}$   C8 = −1.05204 · $10^{-9}$

The values of the factors in the conditions (2) to (4) for the numerical examples 9 to 11 are listed in the following table.

| | Numerical Example | | |
|---|---|---|---|
| Condition | 9 | 10 | 11 |
| (4) H in Wide-Angle End | 1.65 | 1.47 | 1.65 |
| (4) HD in Wide-Angle End | 5.32 | 4.84 | 3.69 |
| (2) | 1.94 · $10^{-14}$ | −8.37 · $10^{-11}$ | 5.39 · $10^{-15}$ |
| (3) | 0.0015 | 0.0015 | 0.0015 |

The aberrations of the embodiments 9 to 11 of viewfinder optical systems are shown in FIGS. 32A to 32D through FIGS. 40A to 40D, respectively, where g, d, C and F are the spectral g-line, d-line, C-line and F-line, respectively, and AM is the meridional focus and AS is the sagittal focus. Incidentally, an object is assumed to lie at 3 meters from the frontmost lens surface and its height is assumed to be at the largest of the field angles in the zooming range.

For comparison with the embodiments 9 to 11, a conventional example is shown under a similar condition to that of the embodiment 9, but different in that only the diffraction optical surface is removed. The following table is the numerical data of this conventional example. Its aberrations are shown in FIGS. 41A to 41D through FIGS. 43A to 43D. As compared with the aberration curves of the embodiments 9 to 11, it is apparent that the lateral chromatic aberration is left not improved.

Conventional Example 2.

f = 152019 · 38~−5604.63   2ω = 62°~30°   Exit Pupil Diameter φ = 8.8~4.8

| | | |
|---|---|---|
| R1 = ∞ | D1 = 1.40 | N1 = 1.491710  v1 = 57.4 |
| R2 = ∞ | D2 = 1.85 | |
| R3 = ∞ | D3 = 3.00 | N2 = 1.491710  v2 = 57.4 |
| R4 = 19.626 | D4 = Variable | |
| R5 = −4.322 | D5 = 1.30 | N3 = 1.491710  v3 = 57.4 |
| R6 = −21.358 | D6 = Variable | |
| R7 = 11.599 | D7 = 2.80 | N4 = 1.491710  v4 = 57.4 |
| R8 = −12.444 | D8 = 1.53 | |
| R9 = ∞ | D9 = 4.20 | N5 = 1.491710  v5 = 57.4 |
| R10 = −7.964 | D10 = Variable | |
| R11 = ∞ | D11 = 14.50 | N6 = 1.570900  v6 = 33.8 |
| R12 = ∞ | D12 = 1.50 | |
| R13 = ∞ | D13 = 24.00 | N7 = 1.570900  v7 = 33.8 |
| R14 = ∞ | D14 = 0.20 | |
| R15 = 27.633 | D15 = 2.50 | N8 = 1.491710  v8 = 57.4 |
| R16 = −12.281 | D16 = 15.00 | |
| R17 = Eye Point | | |

| Variable Separation | Focal Length | | |
|---|---|---|---|
| | 152019.38 | −9987.35 | −5604.63 |
| D4 | 2.39 | 3.54 | 2.34 |
| D6 | 7.52 | 2.69 | 0.89 |
| D10 | 1.35 | 5.03 | 8.04 |

Aspheric Coefficients:

R3:   K = 0   A = 0   B = 6.83625 · $10^{-4}$
      C = −2.08926 · $10^{-5}$   D = 7.97515 · $10^{-7}$   E = 0
R7:   K = 0   A = 0   B = −1.23089 · $10^{-4}$
      C = −6.88633 · $10^{-3}$   D = 4.95196 · $10^{-8}$   E = 0
R9:   K = 0   A = 0   B = −8.15588 · $10^{-4}$
      C = −9.81455 · $10^{-7}$   D = 0   E = 0
R15:  K = 0   A = 0   B = −9.65364 · $10^{-5}$
      C = −9.11764 · $10^{-8}$   D = 0   E = 0

Even in the embodiments 9 to 11, it is preferred that the diffraction optical surface is disposed on a surface other than the frontmost or rearmost surface of the viewfinder optical system as far as possible. Further, in order to maintain the diffraction efficiency at a high value over the entire useful range of wavelengths, it is also preferable to employ the diffraction grating shown in FIG. 13 or 15 on the diffraction optical surface.

What is claimed is:

1. A viewfinder optical system comprising:
   an objective optical system for forming a real image of an object; and
   an eye-piece optical system for converting rays of light from the real image into substantially parallel rays of light,
   wherein said objective optical system is provided with an optical element having a diffraction optical surface.

2. A viewfinder optical system according to claim 1, wherein said diffraction optical surface is rotationally symmetric with respect to an optical axis, wherein, letting a distance from the optical axis be denoted by H, a reference wavelength be denoted by λ, and a phase coefficient with a term in the 2·i-th degree of H be denoted by C2·i, a phase φ(H) of said diffraction optical surface is expressed by the following expression:

$$\phi(H) = (2\pi/\lambda) \cdot (C2 \cdot H^2 + C4 \cdot H^4 + C6 \cdot H^{2 \cdot i})$$

and wherein, letting a phase coefficient with a term in the second degree of H for the j-th diffraction optical surface be denoted by C2j, and a paraxial refractive power and Abbe number of the k-th optical element included in said viewfinder optical system be denoted by ψk and νk, respectively, the following condition is satisfied:

$$0 > \sum_{k=1}^{m}(\psi k/\nu k) \cdot \sum_{j=1}^{n}(2 \cdot C2j/3.45)$$

where n is the number of diffraction optical surfaces in said viewfinder optical system, and m is the number of optical elements in said viewfinder optical system.

3. A viewfinder optical system according to claim 2, satisfying the following condition:

$$0 < \left|\sum_{j=1}^{n}(2 \cdot C2j/3.45)\right| - \left|\sum_{k=1}^{m}(\psi k/\nu k)\right|.$$

4. A viewfinder optical system according to claim 1, further comprising:
an image inverting optical system for converting the real image into a noninverted erecting image.

5. A viewfinder optical system according to claim 1, wherein said objective optical system consists of, in order from an object side, an objective lens of negative refractive power, an image re-forming lens of positive refractive power and an inverting prism for changing an optical path.

6. A viewfinder optical system according to claim 1, wherein said objective optical system consists of, in order from an object side, a first lens unit of negative refractive power, a second lens unit of positive refractive power and a third lens unit of positive refractive power.

7. A viewfinder optical system comprising:
an objective optical system for forming an image of an object; and
an eye-piece optical system for converting rays of light from the image into substantially parallel rays of light,
wherein at least one of said objective optical system and said eye-piece optical system has a diffraction optical surface of rotational symmetry with respect to an optical axis, wherein, letting a distance from the optical axis be denoted by H, a reference wavelength be denoted by λ, and a phase coefficient with a term in the 2·i-th degree of H be denoted by C2·i, a phase φ(H) of said diffraction optical surface is expressed by the following expression:

$$\phi(H) = (2\pi/\lambda) \cdot (C2 \cdot H^2 + C4 \cdot H^4 + C6 \cdot H^6 + \ldots + C2 \cdot i \cdot H^{2 \cdot i})$$

and wherein, letting a phase coefficient with a term in the second degree of H for the j-th diffraction optical surface be denoted by C2j, and a paraxial refractive power and Abbe number of the k-th optical element included in said viewfinder optical system be denoted by ψk and νk, respectively, the following condition is satisfied:

$$0 > \sum_{k=1}^{m}(\psi k/\nu k) \cdot \sum_{j=1}^{n}(2 \cdot C2j/3.45)$$

where n is the number of diffraction optical surfaces in said viewfinder optical system, and m is the number of optical elements in said viewfinder optical system.

8. A viewfinder optical system according to claim 7, satisfying the following condition:

$$0 < \left|\sum_{j=1}^{n}(2 \cdot C2j/3.45)\right| - \left|\sum_{k=1}^{m}(\psi k/\nu k)\right|.$$

9. A viewfinder optical system comprising:
an objective optical system for forming an image of an object; and
an eye-piece optical system for converting rays of light from the image into substantially parallel rays of light,
wherein a diffraction optical element is disposed on an optical element which satisfies the following condition:

$$|HD| > |H|$$

where H is a distance from an optical axis of a maximum zone in a bundle of on-axial light rays passing through optical elements which constitute said viewfinder optical system, and HD is a distance from the optical axis of an off-axial principal ray which halves a bundle of off-axial light rays having an effective maximum field angle.

10. A viewfinder optical system according to claim 9, wherein said diffraction optical surface is rotationally symmetric with respect to an optical axis, wherein, letting a distance from the optical axis be denoted by H, a reference wavelength be denoted by λ, and a phase coefficient with a term in the 2mi-th degree of H be denoted by C2·i, a phase φ(H) of said diffraction optical surface is expressed by the following expression:

$$\phi(H) = (2\pi/\lambda) \cdot (C2 \cdot H^2 + C4 \cdot H^4 + C6 \cdot H^6 + \ldots + C2 \cdot i \cdot H^{2 \cdot i})$$

and wherein, letting a refractive power of the optical element having said diffraction optical surface be denoted by ψh, and a phase coefficient of a term of second degree of H for said diffraction optical surface be denoted by C2h, the following condition is satisfied:

$$\psi h \cdot C2h < 0.$$

11. A viewfinder optical system according to claim 10, wherein, letting a phase coefficient with a term in the second degree of H for the j-th diffraction optical surface be denoted by C2j, and a paraxial refractive power and Abbe number of the k-th optical element included in said viewfinder optical system be denoted by ψk and νk, respectively, the following condition is satisfied:

$$0 > \sum_{k=1}^{m}(\psi k/\nu k) \cdot \sum_{j=1}^{n}(2 \cdot C2j/3.45)$$

where n is the number of diffraction optical surfaces in said viewfinder optical system, and m is the number of optical elements in said viewfinder optical system.

12. A viewfinder optical system according to claim 11, satisfying the following condition:

$$0 < \left| \sum_{j=1}^{n} (2 \cdot C2j / 3.45) \right| - \left| \sum_{k=1}^{m} (\psi k / \nu k) \right|.$$

13. A viewfinder optical system, comprising:
an objective optical system for forming an image of an object; and
an eye-piece optical system for converting rays of light from the image into substantially parallel rays of light,
wherein at least one of said objective optical system and said eye-piece optical system has a diffraction optical surface rotationally symmetrical with respect to an optical axis,
wherein, letting a distance from the optical axis be denoted by H, a reference wavelength be denoted by $\lambda$, and a phase coefficient with a term in the 2·i-th degree of H be denoted by C2·i, a phase $\phi$(H) of said diffraction optical surface is expressed by the following expression:

$$\phi(H) = (2\pi/\lambda) \cdot (C2 \cdot H^2 + C4 \cdot H^4 + C6 \cdot H^6 + \ldots + C2 \cdot i \cdot H^{2 \cdot i})$$

and wherein, letting a phase coefficient with a term in the second degree of H for the j-th diffraction optical surface be denoted by C2j, and a paraxial refractive power and Abbe number of the k-th optical element included in said viewfinder optical system be denoted by $\psi$k and $\nu$k, respectively, the following condition is satisfied:

$$0 < \left| \sum_{j=1}^{n} (2 \cdot C2j / 3.45) \right| - \left| \sum_{k=1}^{m} (\psi k / \nu k) \right|$$

where n is the number of diffraction optical surfaces in said viewfinder optical system, and m is the number of optical elements in said viewfinder optical system.

* * * * *

UNITED STATES PATENT AND TRADEMARK OFFICE
CERTIFICATE OF CORRECTION

PATENT NO. : 6,141,159
DATED : October 31, 2000
INVENTOR(S) : Akihiro Nishio

It is certified that error appears in the above-identified patent and that said Letters Patent is hereby corrected as shown below:

Column 6,

Line 49, "$\sum_{k=1}{}^{m}$" should read -- $\sum_{k=1}^{m}$ -- and "$\sum_{j=1}{}^{n}$" should read -- $\sum_{j=1}^{n}$ --

Line 51, "k-1 J-1" should be deleted

Line 54, "$\sum_{k=1}{}^{m}$" should read -- $\sum_{k=1}^{m}$ --

Column 7,
Lines 6 and 14, "$\sum_{j=1}{}^{n}$" should read -- $\sum_{j=1}^{n}$ -- and "$\Psi_{k=1}{}^{m}$" should read -- $\sum_{k=1}^{m}$ --

Column 8,
Line 38, "NUMERICAL EXAMPLE 1:" should be deleted

Column 11,
Line 57, "K = -1.92334·10$^1$" should read -- K= -1.02334·10$^1$ --

Column 12,
Line 30, "B = -8.46894·10$^{31\ 5}$" should read -- B4 = -8.46894·10$^{-5}$ --
Line 35, "C4 = 3.74344·10$^{-5}$" should read -- C4 = -3.74344·10$^{-5}$ --

Column 13,
Line 19, "K = 1.59638.102" should read -- K=1.59638·10$^2$ --
Line 60, "| HD″> | H |″" should read -- | HD | > | H | --

Column 14,
Line 5, "L4" (second occurrence) should be deleted.

Column 15,
Line 28, "ϕ 32" should read -- ϕ = --
Line 33, "N3=1.49171D" should read -- N3=1.491710 --
Line 59, "B=7.86283.10" should read -- B = 7.86283·10$^{-4}$ --

Column 16,
Line 61, "ϕ 32" should read -- ϕ = --

UNITED STATES PATENT AND TRADEMARK OFFICE
CERTIFICATE OF CORRECTION

PATENT NO.    : 6,141,159
DATED         : October 31, 2000
INVENTOR(S)   : Akihiro Nishio It is certified that error appears in the above-identified patent and that said Letters Patent is hereby corrected as shown below:

Column 17,
Line 53, "$1.94 \cdot 10^{-14}$" should read -- $-1.94 \cdot 10^{-14}$ --
Line 53, "$5.39 \cdot 10^{-15}$" should read -- $-5.39 \cdot 10^{-15}$ --
Line 59, "AM" should read -- $\Delta M$ -- and "AS" should read -- $\Delta S$ --

Column 19,
Line 7, "$C6 \cdot H^{2 \cdot i}$" should read -- $C6 \cdot H^{6} + \ldots + C2 \cdot i \cdot H^{2 \cdot i}$ --

Column 20,
Line 40, "2mi-th" should read -- $2 \cdot i$ -th --.

Signed and Sealed this

Twenty-seventh Day of April, 2004

JON W. DUDAS
*Acting Director of the United States Patent and Trademark Office*